US012757217B2

(12) United States Patent
Fu et al.

(10) Patent No.: US 12,757,217 B2
(45) Date of Patent: Oct. 6, 2026

(54) METHOD AND APPARATUS FOR TRANSMITTING OR RECEIVING DOWNLINK CONTROL INFORMATION IN WIRELESS COMMUNICATION SYSTEM

(71) Applicant: Samsung Electronics Co., Ltd., Gyeonggi-do (KR)

(72) Inventors: Jingxing Fu, Beijing (CN); Feifei Sun, Beijing (CN); Yi Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 506 days.

(21) Appl. No.: 17/916,907

(22) PCT Filed: Apr. 6, 2021

(86) PCT No.: PCT/KR2021/004269

§ 371 (c)(1),
(2) Date: Oct. 4, 2022

(87) PCT Pub. No.: WO2021/206414

PCT Pub. Date: Oct. 14, 2021

(65) Prior Publication Data

US 2023/0156741 A1 May 18, 2023

(30) Foreign Application Priority Data

Apr. 10, 2020 (CN) ......................... 202010280098.6
Dec. 1, 2020 (CN) ......................... 202011398951.0

(51) Int. Cl.
*H04W 72/232* (2023.01)

(52) U.S. Cl.
CPC ................................ *H04W 72/232* (2023.01)

(58) Field of Classification Search
CPC ............... H04W 72/232; H04W 72/23; H04W 72/1273; H04L 5/001; H04L 5/0044;
(Continued)

(56) References Cited

U.S. PATENT DOCUMENTS

2014/0247816 A1 9/2014 Kim et al.
2019/0313385 A1* 10/2019 Yang .................... H04L 1/1887
(Continued)

FOREIGN PATENT DOCUMENTS

EP 3 247 061 11/2017
WO WO 2019/030563 2/2019
WO WO 2021/202551 10/2021

OTHER PUBLICATIONS

3GPP TS 38.212 V16.1.0, 3rd Generation Partnership Project; Technical Specification Group Radio Access Network; NR; Multiplexing and Channel Coding (Release 16), Mar. 2020, 146 pages.
(Continued)

*Primary Examiner* — Austin J Moreau
(74) *Attorney, Agent, or Firm* — The Farrell Law Firm, P.C.

(57) ABSTRACT

According to an embodiment of the present disclosure, a method and an apparatus for receiving downlink control information (DCI) by a user equipment (UE) in a wireless communication system is provided, the method comprises receiving downlink control information (DCI) on one serving cell, identifying whether or not the DCI schedules physical downlink shared channels (PDSCHs) of a plurality of serving cells, receiving data on a PDSCH of the one serving cell in case that the DCI schedules the PDSCH of the one serving cell, and receiving data on the PDSCHs of the plurality of serving cells in case that the DCI schedules the PDSCHs of the plurality of serving cells. Based on the solution provided in the embodiments of the present disclosure, the aspect of being able to schedule the PDSCH of one or more serving cells on one physical downlink control channel (PDCCH) can be achieved and resources occupied by the PDCCH can be saved.

8 Claims, 2 Drawing Sheets

(58) Field of Classification Search
CPC ... H04L 5/0094; H04L 1/0079; H04L 5/0053; H04L 27/26025
See application file for complete search history.

(56) References Cited

U.S. PATENT DOCUMENTS

2020/0092073 A1 3/2020 Papasakellariou et al.
2021/0258996 A1* 8/2021 Xu ........................ H04W 16/32
2023/0041809 A1* 2/2023 Harada ................. H04L 5/0094

OTHER PUBLICATIONS

European Search Report dated Jul. 18, 2023 issued in counterpart application No. 21784865.4-1215, 16 pages.
European Search Report dated Nov. 2, 2023 issued in counterpart application No. 21784865.4-1215, 13 pages.
PCT/ISA/210 Search Report issued on PCT/KR2021/004269, Jul. 9, 2021, pp. 3.
PCT/ISA/237 Written Opinion issued on PCT/KR2021/004269, Jul. 9, 2021, pp. 4.
3GPP TS 38.213 V16.1.0 (Mar. 2020) Technical Specification 3rd Generation Partnership Project; Technical Specification Group Radio Access Network; NR; Physical layer procedures for control (Release 16), pp. 158.
Ericsson, "New WID on NR Dynamic spectrum sharing (DSS)", 3GPP TSG RAN Meeting #86 RP-193260 Sitges, Spain, Dec. 9-12, 2019, pp. 6.
Korean Office Action dated Feb. 23, 2026 issued in counterpart application No. 10-2022-7026659, 20 pages.

* cited by examiner

[Fig. 1]
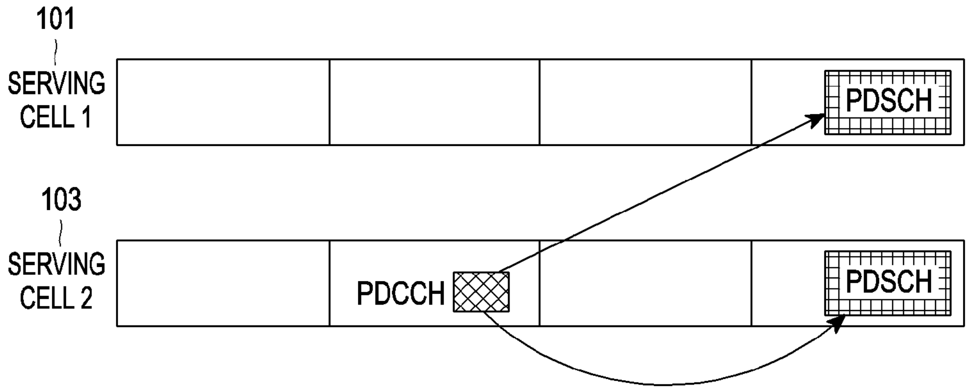
[Fig. 2]
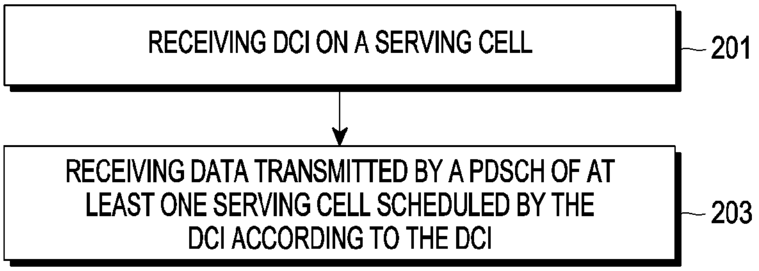
[Fig. 3]
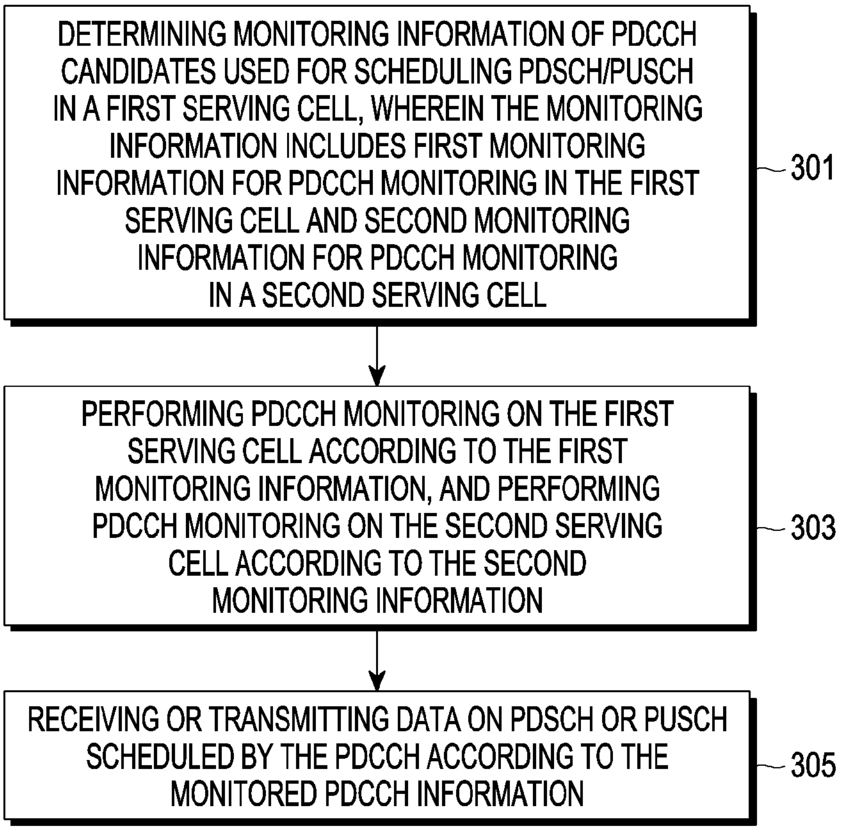

[Fig. 4]
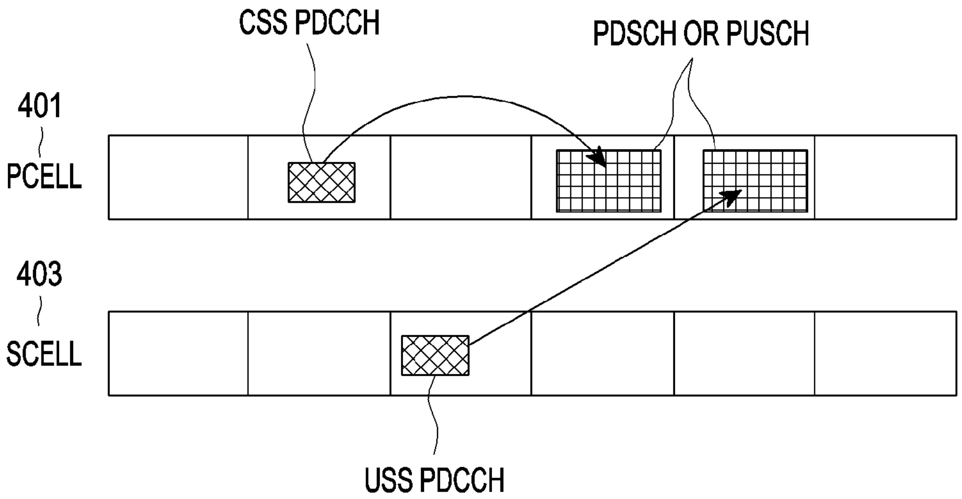
[Fig. 5]
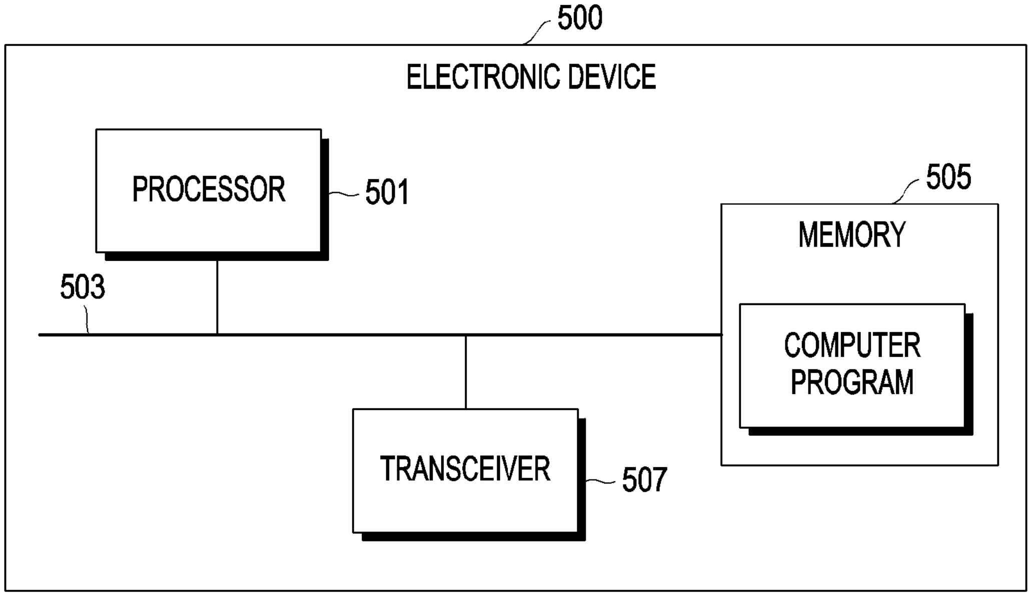

METHOD AND APPARATUS FOR TRANSMITTING OR RECEIVING DOWNLINK CONTROL INFORMATION IN WIRELESS COMMUNICATION SYSTEM

CROSS-REFERENCE TO RELATED APPLICATION(S)

This application is a U.S. National Phase Entry of PCT International Application No. PCT/KR2021/004269, which was filed on Apr. 6, 2021, and claims priority to Chinese Patent Application Nos. 202010280098.6 and 202011398951.0, which were filed in the Chinese Intellectual Property Office on Apr. 10, 2020 and Dec. 1, 2020, respectively, the entire disclosure of each of which is incorporated herein by reference.

TECHNICAL FIELD

The present disclosure relates to a field of communication technology, and in particular, to a method for configuring downlink control information, a method for receiving downlink data and an apparatus, an electronic device and a readable storage medium corresponding to each method.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the Long-term Evolution (LTE) system, transmissions of a Physical Downlink Shared Channel (PDSCH) and a Physical Uplink Shared Channel (PUSCH) are scheduled through Downlink Control Information (DCI) transmitted by a Physical Downlink Control Channel (PDCCH).

A search space for transmitting DCI includes a Common Search Space (CSS) set and a specific search space of User Equipment (UE) (UE-specific Search Space, USS) set. For CSS, any UE can perform demodulation and decoding, while for USS, only certain UEs can perform demodulation and decoding. The format of DCI may be divided into DCI format for scheduling PDSCH (for example, DCI format 1-0, DCI format 1-1) and DCI format for scheduling PUSCH (for example, DCI format 0-0, DCI format 0-1). The format can also be divided into fallback DCI format (for example, DCI format 0-0, DCI format 1-0) and non-fallback DCI format (for example, DCI format 0-1, DCI format 1-1). The number of information bits (simply referred to as the number of bits) contained (for example, configured or required) in the DCI in different formats may be the same or different. The number of bits contained (for example, configured or required) in DCI in a specific DCI format can be simply referred to as the number of bits of the specific DCI format.

The PDCCH for scheduling PDSCH and PUSCH can be located in the same serving cell as the scheduled PDSCH and PUSCH, which is called same-carrier scheduling. The PDCCH for scheduling PDSCH and PUSCH can be located in different serving cells from the scheduled PDSCH and PUSCH, which is called cross-carrier scheduling. A cell transmitting PDCCH is referred to as a scheduling serving cell, and a serving cell transmitting PDSCH/PUSCH is referred to as a scheduled serving cell. In a Carrier Aggregation (CA) system, serving cells may include primary cells (Pcell) and secondary cells (Scell). Subcarrier space configurations of Pcell and Scell may be the same or different. At this time, a UE can receive and send control information and data in multiple serving cells simultaneously. When Pcells and Scells both exist, how to allocate cell resources occupied by PDCCH more reasonably is also an important issue that needs to be improved.

DISCLOSURE OF INVENTION

Technical Problem

The aspect of this disclosure is to better satisfy communication requirements and solve at least one of the technical defects in the prior art.

The present disclosure provides a method and an apparatus for transmitting or receiving downlink control information efficiently in a wireless communication system.

The present disclosure provides a method and an apparatus for transmitting or receiving downlink control information for scheduling a PDSCH/PUSCH of one or more serving cells in a wireless communication system.

Solution to Problem

According to an embodiment of the present disclosure, a method for receiving downlink control information (DCI) by a user equipment (UE) in a wireless communication system is provided, the method comprises receiving downlink control information (DCI) on one serving cell, identifying whether or not the DCI schedules physical downlink shared channels (PDSCHs) of a plurality of serving cells, receiving data on a PDSCH of the one serving cell in case that the DCI schedules the PDSCH of the one serving cell, and receiving data on the PDSCHs of the plurality of serving cells in case that the DCI schedules the PDSCHs of the plurality of serving cells.

According to another embodiment of the present disclosure, a method for monitoring physical downlink control channel (PDCCH) by a user equipment (UE) in a wireless communication system is provided, the method comprises determining monitoring information for PDCCH candidates used for scheduling a first serving cell, wherein the monitoring information comprises first monitoring information for PDCCH monitoring in the first serving cell and second monitoring information for PDCCH monitoring in a second serving cell, performing PDCCH monitoring on the first serving cell based on the first monitoring information, and performing PDCCH monitoring on the second serving cell based on the second monitoring information.

According to further embodiment of the present disclosure, a method for transmitting downlink control information (DCI) by a base station in a wireless communication system is provided, the method comprises transmitting downlink control information (DCI) configured for a user equipment (UE), based on whether or not the DCI schedules physical downlink shared channels (PDSCHs) of a plurality of serving cells, transmitting data on a PDSCH of one serving cell in case that the DCI schedules the PDSCH of one serving cell, and transmitting data on the PDSCHs of the plurality of serving cells in case that the DCI schedules the PDSCHs of the plurality of serving cells.

According to still further embodiment of the present disclosure, a user equipment (UE) in a wireless communication system is provided, the UE comprises a transceiver, and a processor configured to receive, through the transceiver, downlink control information (DCI) on one serving cell, identify whether or not the DCI schedules physical downlink shared channels (PDSCHs) of a plurality of serving cells, receive, through the transceiver, data on a PDSCH of the one serving cell in case that the DCI schedules the PDSCH of the one serving cell, and receive, through the transceiver, data on the PDSCHs of the plurality of serving cells in case that the DCI schedules the PDSCHs of the plurality of serving cells.

According to still further embodiment of the present disclosure, a user equipment (UE) in a wireless communication system is provided, the UE comprises a transceiver and a processor configured to determine monitoring information for physical downlink control channel (PDCCH) candidates used for scheduling a first serving cell, wherein the monitoring information comprises first monitoring information for PDCCH monitoring in the first serving cell and second monitoring information for PDCCH monitoring in a second serving cell, perform, through the transceiver, PDCCH monitoring on the first serving cell based on the first monitoring information, and perform, through the transceiver, PDCCH monitoring on the second serving cell based on the second monitoring information.

According to still further embodiment of the present disclosure, a base station in a wireless communication system is provided, the base station comprises a transceiver, and a processor configured to transmit, through the transceiver, downlink control information (DCI) configured for a user equipment (UE), based on whether or not the DCI schedules physical downlink shared channels (PDSCHs) of a plurality of serving cells, transmit, through the transceiver, data on a PDSCH of one serving cell in case that the DCI schedules the PDSCH of one serving cell, and transmit, through the transceiver, data on the PDSCHs of the plurality of serving cells in case that the DCI schedules the PDSCHs of the plurality of serving cells.

According to a first aspect, an embodiment of the present disclosure provides a method for configuring downlink control information, including the following steps of:

configuring a first DCI in a format, wherein the first DCI is used to schedule a PDSCH of at least one second serving cell on one first serving cell.

Optionally, the number of bits of the first DCI satisfies at least one of the following:

the number of bits of the first DCI is equal to a designated bit number;

the number of bits of the first DCI is not equal to the number of bits of any existing DCI;

the number of bits of the first DCI is equal to the number of bits of a first designated DCI that already exists in the first serving cell;

the number of bits of the first DCI is equal to the number of bits of a second designated DCI that already exists in any serving cell in at least one second serving cell;

when the first DCI is used to schedule the PDSCHs of at least two second serving cells, the number of bits of the first DCI is equal to the number of bits of a third designated DCI that satisfies a first preset condition among third designated DCI that already exist in each of the at least two second serving cells;

when the first DCI is used to schedule the PDSCHs of at least two second serving cells, the number of bits of the first DCI is equal to the number of bits of a fourth designated DCI that already exists in a serving cell satisfying a second preset condition among the at least two second serving cells.

Optionally, when the first DCI is used to schedule PDSCHs of at least two second serving cells, and the number of bits of the first DCI is equal to the number of bits of the second designated DCI that already exists in any one of the at least one second serving cell, the method further includes:

if the number of bits of the second designated DCI of each of the at least two second serving cells is not completely the same, the field contained in the first DCI is configured based on the field contained in the second designated DCI whose bit number is equal to the number of bits of the specific DCI;

if the number of bits of the second designated DCI of each of the at least two second serving cells is the same, the fields contained in the first DCI is configured based on fields contained in the second designated DCI of a serving cell satisfying a third preset condition among the at least two second serving cells.

Optionally, the first DCI includes a predetermined field, and the predetermined field is used to indicate a second serving cell scheduled by the first DCI;

wherein, the predetermined field is a newly defined field, or a newly defined field contained in an existing DCI.

Optionally, the first DCI described above includes at least one of the following indicator fields:

BWP indicator field;

Minimum Applicable Scheduling Offset Indicator (MASOI) field;

Rate Matching Indicator (RMI) field;

Zero Power Channel State Information Reference Signal resource trigger (ZCRT) field;

Antenna Port (AP) field;

Modulation Coding Scheme (MCS) field;

New Data Indicator (NDI) field; and

Redundancy Version (RV) field.

Optionally, for any type of the BWP indicator field, MASOI field, RMI field, ZCRT field, AP field, MCS field, NDI field, or RV field, the number of fields of this type is equal to a number of the second serving cells, one field of this type corresponds to one of the second serving cells.

Optionally, for fields of a type among the BWP indicator field or the MASOI field, if the number of the fields of this type contained in the first DCI is less than the number of the second serving cells, the fields of this type satisfy at least one of the following:

at least one field of this type is used for indicating indicator information corresponding to the field of at least two serving cells among the at least two second serving cells;

this field is not used for indicating indicator information corresponding to this field of any one of the second serving cells;

this field is used for indicating the indicator information corresponding to the field of a first serving cell among the at least two second serving cells; and this field is used for indicating first designated message of at least one serving cell among the at least two second serving cells.

Optionally, for fields of any type of the RMI field, ZCRT field, AP field, MCS field, NDI field, or RV field, if a number of fields of this type contained in the first DCI is less than the number of the second serving cells, the fields of this type are used for information indication for each of the second serving cells, and at least one field of this type is used to jointly indicate information corresponding to the field of this type of at least two of the second serving cells.

According to a second aspect, an embodiment of the present disclosure provides a method for receiving downlink data, including the following steps of:

receiving DCI on a serving cell;

receive data transmitted by a PDSCH of at least one serving cell scheduled by the DCI according to the DCI.

Optionally, the receiving DCI on one serving cell includes:

receiving DCI in a predetermined format on the one serving cell, and the DCI in the predetermined format can be used to schedule PDSCHs of at least two serving cells.

Optionally, when the DCI in the predetermined format contains PDSCH information of at least two serving cells, the receiving data transmitted by the PDSCH of at least one serving cell scheduled by the DCI according to the DCI includes:

receiving the data transmitted by the PDSCHs of the at least two serving cells scheduled by the DCI according to the DCI.

Optionally, the method further includes:

sending Hybrid Automatic Repeat request Acknowledge (HARQ-ACK) information corresponding to the PDSCHs of the at least two serving cells.

Optionally, the receiving the data transmitted by the PDSCHs of at least one serving cell scheduled by the DCI according to the DCI includes:

determining that the DCI is used to schedule the PDSCHs of the at least two serving cells according to an indication of a predetermined field in the DCI; and receiving the data transmitted by the PDSCHs of the at least two serving cells scheduled by the DCI.

Optionally, the receiving the data transmitted by the PDSCHs of the at least two serving cells scheduled by the DCI includes:

determining a serving cell indicated by each indicator field in the DCI;

determining the indication of the indicator field corresponding to each serving cell in the DCI; and receiving the data transmitted by the PDSCH of each serving cell according to the indication of the indicator field corresponding to each serving cell in the DCI.

Optionally, the determining the serving cell indicated by each indicator field in the DCI includes:

receiving indicator information corresponding to each indicator field in the DCI; and determining the serving cell indicated by each indicator field in the DCI according to the indicator information.

Optionally, for any indicator field in the DCI, when any one of the indicator fields is used to indicate at least two serving cells, the determining indication of the indicator field corresponding to each serving cell in the DCI includes:

receiving a mapping relationship of any indicator field, where the mapping relationship is a corresponding relationship between a field indicator value and the indication of the at least two serving cells;

determining the indication that the indicator field corresponds to each of the at least two serving cells, according to the indicator value of the indicator field and the mapping relationship.

According to a third aspect, an embodiment of the present disclosure provides a method for monitoring Physical Downlink Control Channel (PDCCH), including the following steps of:

determining monitoring information of PDCCH candidates used for scheduling a first serving cell, where the monitoring information includes first monitoring information for PDCCH monitoring in the first serving cell and second monitoring information for PDCCH monitoring in a second serving cell;

performing PDCCH monitoring on the first serving cell according to the first monitoring information, and performing PDCCH monitoring on the second serving cell according to the second monitoring information.

Optionally, the monitoring information includes a number of PDCCH candidates and/or a number of non-overlapping Control Channel Elements (CCEs) to be monitored;

the PDCCH candidates are first PDCCH candidates used for scheduling the Physical Downlink Shared Channel (PDSCH) of the first serving cell, or second PDCCH candidates used for scheduling the Physical Uplink Shared Channel (PUSCH) of the first serving cell;

the PDCCH candidates include PDCCH candidates corresponding to Common Search Space (CSS) and/or PDCCH candidates corresponding to UE-specific Search Space (USS).

Optionally, the first monitoring information includes monitoring information of PDCCH candidates corresponding to the CSS and/or monitoring information of PDCCH candidates corresponding to the USS; and/or, the second monitoring information includes monitoring information of PDCCH candidates corresponding to the CSS and/or monitoring information of PDCCH candidates corresponding to the USS.

Optionally, determining monitoring information for PDCCH candidates used for scheduling a first serving cell according to at least one of:

a first total number which is a total number of PDCCH candidates used for scheduling the first serving cell and/or a total number of non-overlapping Control Channel Elements (CCEs);

monitoring capability configuration information of the first serving cell;

monitoring capability configuration information of the second serving cell;

SubCarrier Spacing (SCS) configuration information of the first serving cell;

SCS configuration information of the second serving cell.

Optionally, the determining monitoring information of PDCCH candidates used for scheduling a first serving cell includes:

determine maximum monitoring capability information;

determining monitoring information of PDCCH candidates used for scheduling the first serving cell based on the first total number and the maximum monitoring capability information, wherein the first total number includes the total number of PDCCH candidates used for scheduling the first serving cell and/or the total number of non-overlapping CCEs.

Optionally, the determining the maximum monitoring capability information includes:

determining maximum monitoring capability information corresponding to the first serving cell and the second serving cell, in response to the monitoring capability configuration information of the first serving cell and the second serving cell being the same as the SCS configuration information;

the determining monitoring information of PDCCH candidates used for scheduling the first serving cell based on the first total number and the maximum monitoring capability information includes:

determining the monitoring information corresponding to the first serving cell and the second serving cell based on the first total number and the maximum monitoring capability information;

determining the first monitoring information and the second monitoring information according to the monitoring information corresponding to the first serving cell and the second serving cell.

Optionally, the determining the first monitoring information and the second monitoring information according to the monitoring information corresponding to the first serving cell and the second serving cell includes:

acquiring monitoring priorities corresponding to the first serving cell and the second serving cell;

determining the first monitoring information and the second monitoring information according to the monitoring information corresponding to the first serving cell and the second serving cell and the monitoring priorities.

Optionally, the first total number includes a second total number corresponding to the first serving cell and a third total number corresponding to the second serving cell;

the determining the maximum monitoring capability information includes:

determining first maximum monitoring capability information corresponding to the first serving cell and second maximum monitoring capability information corresponding to the second serving cell;

the determining monitoring information of PDCCH candidates used for scheduling the first serving cell based on the first total number and the maximum monitoring capability information includes:

determining the first monitoring information based on the second total number and the first maximum monitoring capability information;

determining the second monitoring information based on the third total number and the second maximum monitoring capability information.

Optionally, the number of DCI sizes monitored when the PDCCH monitoring is performed on the first serving cell and the second serving cell is less than or equal to a first value; and/or, the number of DCI sizes monitored when the PDCCH monitoring is performed on the first serving cell is less than or equal to a second value; and/or, the number of DCI sizes monitored when the PDCCH monitoring is performed on the second serving cell is less than or equal to a third value; and/or, the number of DCI monitored when the PDCCH monitoring is performed on the first serving cell and the second serving cell is less than or equal to a fourth value; and/or, the number of DCI monitored when the PDCCH monitoring is performed on the first serving cell is less than or equal to a fifth value; and/or, the number of DCI monitored when the PDCCH monitoring is performed on the second serving cell is less than or equal to a sixth value.

According to a fourth aspect, an embodiment of the present disclosure provides an apparatus for configuring downlink control information, wherein, the apparatus includes at least one processor, and the at least one processor is configured to:

configure a first DCI in a format, wherein the first DCI is used to schedule a PDSCH of at least one second serving cell on one first serving cell.

According to a fifth aspect, an embodiment of the present disclosure provides an apparatus for receiving downlink data, wherein, the apparatus incudes at least one processor, and the at least one processor is configured to:

receive DCI on a serving cell;

receive data transmitted by a PDSCH of at least one serving cell scheduled by the DCI according to the DCI.

According to a sixth aspect, an embodiment of the present disclosure provides an apparatus for monitoring Physical Downlink Control Channel (PDCCH), characterized in that, including at least one processor, and the at least one processor is configured to:

determine monitoring information of PDCCH candidates used for scheduling a first serving cell, where the monitoring information includes first monitoring information for PDCCH monitoring in the first serving cell and second monitoring information for PDCCH monitoring in a second serving cell;

perform PDCCH monitoring on the first serving cell according to the first monitoring information, and perform PDCCH monitoring on the second serving cell according to the second monitoring information.

According to a seventh aspect, an embodiment of the present disclosure provides an electronic device, including: a memory and a processor, wherein the memory stores computer program; and the processor is used to perform the method according to the first, second or third aspect when the above computer program is executed.

According to an eighth aspect, an embodiment of the present disclosure provides a computer-readable storage medium, used to store a computer program that, when executed by a processor, is caused to execute the method according to the first, second or third aspect.

The beneficial effects of technical solutions provided by the embodiments of the present disclosure will be described in specific embodiments below, in combining with the specific and optional embodiments, which is not described here.

BRIEF DESCRIPTION OF DRAWINGS

In order to more clearly describe the technical solutions in the embodiments of the present disclosure, the following will briefly introduce the drawings that need to be used in the description of the embodiments of the present disclosure.

FIG. 1 is a schematic diagram illustrating one PDCCH scheduling two PDSCHs according to an example of the present disclosure;

FIG. 2 is a schematic flowchart illustrating a method for receiving downlink data according to an embodiment of the present disclosure;

FIG. 3 is a schematic flowchart illustrating a method for monitoring PDCCH according to an embodiment of the present disclosure;

FIG. 4 is a schematic diagram illustrating that a plurality of serving cells schedule one serving cell according to an embodiment of the present disclosure;

FIG. 5 is a schematic structural diagram illustrating an electronic device to which an embodiment of the present disclosure is applicable.

MODE FOR THE INVENTION

Hereinafter, embodiments of the present disclosure are detailed described. Examples of the embodiments are shown in the accompanying drawings, wherein the same or similar reference numerals represent the same or similar elements or elements having the same or similar functions throughout. The embodiments described below with reference to the drawings are exemplary and are only used to explain the present disclosure, and cannot be construed as limiting the present disclosure.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Those skilled in the art will understand that, unless specifically stated otherwise, the singular forms "a", "an" and "the" may include plural forms. It should be further understood that the word "comprise" and "include" used in the specification of the present disclosure refers to the presence of the described features, integers, steps, operations, elements and/or components, but does not exclude the presence or addition of one or more other features, integers, steps, operations, elements, components, and/or combinations thereof. It should be understood that when an element is referred to as being "connected" or "coupled" to another element, it can be directly connected or coupled to the other element, or intermediate elements may also be present. Furthermore, "connected" or "coupled" as used herein may include wirelessly connected or wirelessly coupled. As used herein, the term "and/or" includes all or any of the elements and all combinations of one or more of the associated listed items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Unless otherwise defined, all terms (including technical and scientific terms) as used herein have the same meaning as commonly understood by those skilled in the art to which the present disclosure belongs. Terms such as "UE", "terminal" and "terminal equipment" used herein compass not only apparatus with a wireless signal receiver having no emission capability but also apparatus with receiving and emitting hardware capable of carrying out bidirectional communication over a bidirectional communication link. Such apparatuses can include cellular or other communication apparatuses with a single-line display or multi-line display or without a multi-line display; Personal Communication System (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal", "terminal equipment" and "user equipment" as used herein may be portable, transportable, mountable in transportations (air, sea and/or land transportations), or suitable and/or configured to run locally and/or distributed in other places in the earth and/or space for running. The "terminal", "terminal equipment" and "user equipment" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box. According to an embodiment of the disclosure, an access network (AN) may provide a channel for wireless communication with the electronic device. An AN may be a radio access network (RAN), a base station, an eNB, an eNodeB, a 5G node, a transmission/reception point (TRP), or a 5th generation NodeB (5GNB).

Referring to 3GPP TS 38.212 describing for DCI formats in 5G system, DCI transports downlink control information for one or more cells with one RNTI, the existing DCI formats are defined in the below Table 1. The DCI formats may be monitored in a common search space (CSS) or a UE-specific search space (USS).

TABLE 1

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group Of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s)) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

For a UE configured with multiple serving cells, the UE can receive PDCCH and PDSCH in the multiple serving cells, and subcarrier space configuration of the multiple serving cells may be the same or different. However, the existing PDCCH can only schedule the PDSCH or the PUSCH in one serving cell as shown in the Table 1. In order to better save the resources occupied by the PDCCH, in the solution provided in embodiments of the present disclosure, one PDCCH (that is, DCI carried in the PDCCH) can schedule the PDSCH of one serving cell, or multiple PDSCHs of multiple (including two) different serving cells. In addition, based on the solution provided in the embodiments of the present disclosure, it is possible to achieve a more reasonable and effective saving of resources occupied by the PDCCH, and has little impact on the performance of the PDSCH scheduled by the PDCCH. FIG. 1 is a schematic diagram illustrating one PDCCH scheduling two PDSCHs according to an example of the present disclosure. As an example, as shown in FIG. 1, serving cell 1 101 and serving cell 2 103 are two serving cells of one UE. In FIG. 1, the larger rectangular areas represent cell resources of the serving cell, and areas corresponding to PDCCH and PDSCH are cell resources occupied by PDCCH and PDSCH respectively. As shown in FIG. 1, when a base station sends DCI to the UE, the DCI may be carried on one PDCCH of the serving cell 2 103, and can schedule the PDSCHs of the serving cell 1 101 and the serving cell 2 103. That is, one DCI may correspond to two scheduled cells.

For the convenience of description, in the embodiments of the present disclosure, a serving cell where the PDCCH carrying the DCI is located (that is, the serving cell transmitting DCI) may be referred to as a scheduling serving cell, such as the serving cell 2 103 in FIG. 1, and a serving cell where the scheduled PDSCH is located may be referred to as a scheduled serving cell, such as the serving cell 1 101 and the serving cell 2 103 in FIG. 1.

It can be understood that the scheduled serving cell and the scheduling serving cell may be located in the same serving cell or in different serving cells. When one DCI can schedule the PDSCH of one or more serving cells, the scheduled serving cell may or may not include the scheduling serving cell.

In order to make the purposes, technical solutions, and advantages of the present disclosure clearer, how the respective optional implementations of the present disclosure and the technical solutions according to the embodiments of the present disclosure solve the above technical problems will be described in combination with specific embodiments and drawings. The following specific embodiments may be combined with each other, and the same or similar concepts or processes may not be repeated in some embodiments. The embodiments of the present disclosure will be described below with reference to the drawings.

In order to achieve the purpose of one PDCCH being able to schedule the PDSCH of one or more serving cells, the solution provided in embodiments of the present disclosure defines a new DCI format. Specifically, embodiments of the present disclosure provides a DCI configuration method. In this method, a DCI format is defined for distinguishing from various existing DCI formats. In the embodiments of the present disclosure, the newly defined DCI is referred to as a first DCI, which may also be referred to as a specific DCI. The first DCI or the specific DCI can be used to schedule the PDSCH of at least one serving cell on one serving cell, that is, the DCI can schedule the PDSCH of at least two serving cells.

It should be noted that, in actual disclosures, the name of the first DCI or the specific DCI is not limited in the embodiments of the present disclosure, and the "first" or "specific" is only used for distinguishing from the existing DCI format. In the following description, the specific DCI will be represented by DCI_x (or DCI_format x). In addition, for the convenience of description, a cell transmitting the PDCCH (that is, the serving cell where the PDCCH carrying the specific DCI is located) is referred to as a first serving cell, and a serving cell scheduled by the specific DCI is referred to as s second serving cell. The second serving cell may or may not include the first serving cell.

The specific DCI will be described in detail below.

In an optional embodiment of the present disclosure, the first or second serving cells described above includes a bandwidth part (BWP) of the serving cell. In the 5G system, the base station may configure one or more BWPs to the UE, and configuration information for BWP can be provided by the base station to the UE through higher layer signaling, for example, radio resource control (RRC) signaling. At least one BWP among the one or a plurality of BWPs may be activated. Whether or not to activate the configured BWP may be informed from the base station to the UE in a semi-static manner through RRC signaling or may be dynamically transmitted through DCI.

That is, the serving cell in the embodiments of the present disclosure can be the serving cell in the usual sense, i.e., the cell, or the BWP of the serving cell. That is, the specific DCI may also be the DCI of the PDSCH used to schedule at least one BWP. According to the DCI information of one PDCCH, the UE can receive the PDSCH on at least one BWP. For example, the specific DCI can be used to schedule PDSCHs on two BWPs of two serving cells. For another example, it may be supposed that one serving cell may correspond to multiple active BWPs, and the PDSCH of at least one of the second serving cells described above may also refer to one or more active BWPs of one serving cell.

For the convenience of description, the following is an example in which one PDCCH (that is, the DCI carried in the PDCCH) schedules the PDSCH on at least one serving cell. Of course, it can also be applied to the case where one PDCCH schedules the PDSCH on at least one BWP.

In an optional embodiment of the present disclosure, the number of bits in the foregoing specific DCI meets at least one of the following:

A. the number of bits of the specific DCI is equal to a designated bit number;

B. the number of bits of the specific DCI is equal to the number of bits of a first designated DCI that already exists in the first serving cell;

C. the number of bits of the specific DCI is equal to the number of bits of a second designated DCI that already exists in any serving cell of at least one second serving cells;

D. when the specific DCI is used to schedule the PDSCH of at least two second serving cells, the number of bits of the specific DCI is equal to the number of bits of a third designated DCI satisfying a first preset condition among existing third designated DCIs of each serving cell in the at least two second serving cells;

E. when the specific DCI is used to schedule the PDSCH of at least two second serving cells, the number of bits of the specific DCI is equal to the number of bits of an existing fourth designated DCI of the serving cell satisfying a second preset condition among the at least two second serving cells;

F. the number of bits of the specific DCI is not equal to the number of bits of any existing DCI.

First of all, it should be noted that each of the above-mentioned designated DCIs (the first designated DCI, the second designated DCI, etc.) is existing DCI, and each of the designated DCIs is not limited in the embodiment of the present disclosure, and it may be predetermined by the base station and the UE, that is, through protocols. For example, the designated DCI may be DCI in any existing format, or DCI in DCI format 1-1, or DCI in DCI format 1-0, etc. In each of the foregoing optional manners, respective designated DCIs may be DCIs in the same format, or in different formats.

Each of the above A to F will be described separately.

For the above A, that is, the number of bits of the specific DCI is equal to the designated bit number, where the designated bit number is the number of bits predetermined through the protocols, or a value pre-configured for the UE by the base station. That is, the number of bits contained in the specific DCI may be a fixed value, which is predetermined by the base station and the UE, or configured for the UE by the base station in advance. The fixed value may be the same as or different from the number of bits of DCI in any existing format.

For example, the number of bits of DCI_x may be the same as the number of bits of the existing DCI format. For example, the number of bits of DCI_x is the same as the number of bits of the DCI format 1_1. This method can be used to save the resource overhead occupied by PDCCH by scheduling the PDSCHs of two serving cells through one PDCCH, without increasing or decreasing the number of blind detections on the PDCCH. Alternatively, DCI_x has a new DCI format, and the number of bits of DCI_x may be different from the number of bits of the existing DCI format. When this method is adopted, since the DCI_x is a dedicated one for scheduling the PDSCH of one or more serving cells. The DCI_x may be configured with the number of bits corresponding to the number of PDSCHs scheduled by the DCI_x, that is, the number of bits contained in the DCI_x may be configured accordingly based on the number of PDSCHs of the serving cell actually scheduled. For example, when DCI_x scheduling the PDSCHs of two serving cells, the number of bits of the DCI_x may be a relatively large value, and the DCI_x may contain contents of fields used to indicate the scheduled PDSCHs, respectively. Therefore, the performance of one or more scheduled PDSCHs may be improved.

For the above B, the number of bits of the specific DCI is equal to the number of bits of the first designated DCI that exists in the first serving cell, that is, the DCI_x may be DCI in a designated format for a serving cell where the PDCCH carrying the DCI is located. In the example shown in FIG. 1, the number of bits of the DCI_x may be equal to the number of bits of DCI format 1_1 for the serving cell 2.

For the above C, the number of bits of the specific DCI is equal to the number of bits of a second designated DCI that already exists in any serving cell of at least one second serving cells. For example, DCI_x is used to schedule PDSCHs of the serving cells A and B, if the second designated DCI has DCI format 1_1, the number of bits of the DCI_x may be the number of bits of the DCI format 1_1 for the serving cell A, or the number of bits of the DCI format 1_1 for the serving cell B. For this method, in practical, the serving cell for which the number of the DCI format 1_1 is used as the number of bits of the DCI_x may be determined by the UE according to high-layer signaling configuration, or protocol preset, or implicit signaling.

For the above D, in this manner, the DCI_x may be used to schedule the PDSCHs of at least two second serving cells, and the number of bits of DCI_x corresponds to the number of bits in the third designated DCI. Specifically, the number of bits of the third designated DCI of which scheduled serving cell is used may be determined by the first preset condition. Optionally, the first preset condition may include but is not limited to at least one of the largest number of bits or the smallest number of bits. For example, it may be supposed that the first preset condition is that the number of bits is the largest, the DCI_x is used to schedule the PDSCHs of the serving cells A and B, the third designated DCI has DCI format 1_1, and the number of bits a of DCI format 1_1 for the serving cell A is greater than the number of bits b of DCI format 1_1 for the serving cell B, and the number of bits of DCI_x is a.

For the above E, in this manner, DCI_x may be used to schedule the PDSCHs of at least two second serving cells, the number of bits of DCI_x corresponds to the number of bits of the fourth designated DCI. Specifically, the number of bits of the fourth designated DCI of which scheduled serving cell is used may be determined by the second preset condition. Optionally, the second preset condition may include at least one of the following:

an index of the serving cell is the smallest; the index of the serving cell index is the largest; the number of Transport Blocks (TBs) supported by the serving cell is the largest; and the number of TBs supported by the serving cell is the smallest.

For example, it may be supposed that the second preset condition is that the index of the serving cell is the largest, DCI_x is used to schedule the PDSCHs of the serving cells A and B, the fourth designated DCI has DCI format 1_1, and the cell index IndexA of the serving cell A is smaller than the cell index IndexB of the serving cell B, the number of bits of the DCI_x is the number of bits of DCI format 1_1 for the serving cell B.

For the above F, the number of bits of the specific DCI is not equal to the number of bits of any existing DCI. For example, since the specific DCI can schedule the PDSCHs of one or more serving cells, in order to ensure performance of the multiple scheduled PDSCHs, the number of bits of the specific DCI may be greater than the number of bits of DCI in any existing format, of course, other manners may also be employed. In this manner, the number of bits of the specific DCI may be a fixed value or a variable value, and the UE can determine the number of bits of the specific DCI by receiving a corresponding indication from the base station.

Optionally, when the specific DCI is used to schedule PDSCHs of at least two second serving cells, and the number of bits of the specific DCI is equal to the number of bits of a second designated DCI that already exists in any serving cell of the at least one second serving cells, that is, when the number of scheduled serving cells in the above C is two or more, the configuration method may further include:

- if the number of bits of the second designated DCI of each of the at least two second serving cells is not completely the same, the field of the specific DCI is configured based on the fields of the second designated DCI in which the number of bits is equal to the number of bits of the specific DCI;
- if the number of bits of the second designated DCI of respective ones of the at least two second serving cells is the same, the fields of the specific DCI is configured based on the fields of the second designated DCI of the serving cell satisfying the third preset condition among the at least two second serving cells.

That is, each field in the specific DCI may be configured according to the fields of the existing second designated DCI of any serving cell scheduled by the specific DCI. Optionally, it may be configured according to the fields of the existing second designated DCI in which the number of bits is the same as that in the specific DCI. If the DCI_x of the serving cell A can schedule the PDSCHs of the serving cells A and B, the number of bits of DCI format 1_1 for the scheduling serving cell A is a, and the number of bits of DCI format 1_1 for the scheduling serving cell B is b, and the number of bits of the DCI_x is a, the configuration of fields in DCI_x may be performed according to the DCI format 1_1 for the serving cell A. In addition, if the number of bits of the second designated DCI of respective scheduled serving cells are the same, the second designated DCI of which scheduled serving cell is specifically used to configure the fields in the DCI_x may be determined according to the third preset condition. Wherein, the third preset condition may be configured as required, for example, it may be the same as or different from the second preset condition described above.

In practical, the base station can indicate to the UE that the fields of DCI_x is configured according to the second designated DCI of which serving cell through high-layer signaling or implicit signaling, or the base station and the UE can predetermine a manner, according to this determination, the second designated DCI in which serving cell that is used to configure the fields of the DCI_x may be determined by the UE.

In order to better understand the specific DCI supported in the technical solution according to the embodiments of the present disclosure, optional methods for configuring the number of bits of the DCI will be described more detail below in conjunction with several optional examples in Example 1 below. In the following examples, take the case that DCI_x schedules the PDSCHs of two serving cells as an example. In each example, for the sake of description, it may be assumed that the existing designated DCI (corresponding to the first designated DCI, the second designated DCI, the third designated DCI or the fourth designated DCI, etc.) has DCI format 1_1. When a PDCCH of one serving cell schedules two serving cells, a serving cell for which the number of bits of the DCI format 1_1 is used as the number of bits of the DCI_x may be selected by one of the following optional solutions.

Example 1: Optional Configurations of the Number of Bits of DCI

Example 1.1

A DCI format 1_1 with a larger number of bits among DCI formats 1_1 of the scheduled serving cells is selected as the number of bits of the DCI_x. For example, the DCI of the serving cell A can schedule the serving cells A and B, and the number of bits of the DCI format for the scheduling serving cell A is a, and the number of bits of DCI format 1_1 for the scheduling serving cell B is b, if a is greater than or equal to b, the number of bits of the DCI_x is equal to a, and if a is less than b, the number of bits of the DCI_x is equal to b. In this way, since the number of bits of the DCI_x is relatively large, the performance of the PDSCH scheduled by the DCI_x may be relatively better, without increasing the number of blind detections on the PDCCH.

Example 1.2

The number of bits of the DCI format 1_1 for the serving cell where the PDCCH is located is selected as the number of bits of the DCI_x. For example, the DCI of the serving cell A can schedule the serving cells A and B, and the number of bits of the DCI format 1_1 for the scheduling serving cell A is a, the number of bits of the DCI format 1_1 for the serving cell B is b, and the serving cell where the PDCCH is located is the serving cell A, then the number of bits of the DCI_x is equal to a. In this way, the protocol may be realized relative simply without increasing the number of blind detections on the PDCCH.

Example 1.3

Each of the numbers of bits of the DCI formats 1_1 of the scheduled serving cell may be used as the number of bits of the DCI_x, and the number of bits of the DCI format 1_1 for any scheduled serving cell may be selected by the base station as the number of bits of the DCI_x.

For example, the DCI of the serving cell A can schedule the serving cells A and B, the number of bits of the DCI format 1_1 for the scheduling serving cell A is a, and the number of bits of the DCI format 1_1 for the scheduling serving cell B is b, the number of bits of the DCI_x may be determined as a or b by the base station. In practical, since the UE has been blindly detecting the DCI format 1_1 for the serving cell A and the DCI format 1_1 for the serving cell B, that is to say, the UE has been blindly detecting DCIs with bit numbers equal to a and DCIs with bit numbers equal to b. In this way, the scheduling flexibility of the base station may be increased without increasing the number of blind detections on the PDCCH, and the PDSCH performance of the serving cell may be guaranteed.

Example 1.4

The serving cell for which the number of the DCI format 1_1 is used as the number of bits of the DCI_x may be determined according to high-layer signaling configuration, or protocol preset, or implicit signaling.

For example, the DCI of the serving cell A can schedule the serving cells A and B, the number of bits of the DCI format 1_1 for the scheduling serving cell A is a, and the number of bits of DCI format 1_1 for the scheduling serving cell B is b, and it may be determined that the number of bits of the DCI_x is equal to a by the UE according to the implicit signaling. For example, the serving cell A supports the PDSCH with two TBs, the serving cell B supports the PDSCH with one TB, and the number of bits of DCI format 1_1 for the serving cell that supports the PDSCH with two TBs may be selected by the base station as the number of bits of the DCI_x, and the corresponding indicator information may be sent to the UE. If the indicator information is sent through implicit signaling, the UE may determine the number of bits of DCI format 1_1 for the serving cell A as the number of bits of the DCI_x based on the implicit signaling.

Using the method in this example, it is possible to improve a certain aspect of the scheduled PDSCH performance without increasing the number of blind detections on the PDCCH. For example, the number of bits of the DCI format 1_1 for the serving cell that supports PDSCH with two TBs is selected as the number of bits of the DCI_x, and there may be two sets of MCS, NDI, and RV fields respectively used for the indication of two serving cells, which can improve the PDSCH performance of the two serving cells. For another example, the number of bits of the DCI format 1_1 for the serving cell with a small cell index among the scheduled serving cells is also selected as the number of bits of the DCI_x through protocol preset.

Or, as another optional solution, according to different actual disclosure conditions, the method used may be determined based on protocol preset, or high-layer signaling configuration, or implicit signaling. For example, when the DCI of the serving cell A can schedule the serving cells A and B, the number of bits of the DCI format 1_1 for the scheduling serving cell A is a, and the number of bits of DCI format 1_1 for the scheduling serving cell B is b, when a is not equal to b, the number of bits of the DCI_x may be equal to a or b. Optionally, when the number of bits of the DCI_x is equal to a, the fields in DCI_x may be configured according to the respective fields of the DCI format 1_1 only when the serving cell A is scheduled. For example, setting of fields such as the number of bits in antenna port field, Modulation Coding Scheme (MCS), New Data Indicator (NDI), Redundancy Version (RV) field, frequency domain resource assignment (FDRA) may be configured according to the field of the DCI format 1_1 for the scheduling serving cell A. That is, when the number of bits of the DCI_x may be equal to a, the respective fields contained in the DCI_x may be configured with reference to the respective fields in the DCI format 1_1 for the serving cell A. The specific content contained in the DCI_x may be adjusted based on the DCI format 1_1 when the serving cell A is scheduled. The DCI for scheduling the PDSCH of one serving cell is adjusted to be the DCI that can schedule the PDSCH of one or more serving cells. When the number of bits of the DCI_x is equal to b, the fields in the DCI_x may be configured according to the fields of the DCI format 1_1 when the serving cell B is scheduled.

When a is equal to b, optionally, it may be determined through implicit signaling whether the fields in the DCI_x is configured according to the fields of DCI format 1_1 when the serving cell A is scheduled, or according to the fields of DCI format 1_1 when the serving cell B is scheduled. For example, the serving cell A supports the PDSCH with two TBs, the serving cell B supports one TB, and the base station selects the field content of the DCI format 1_1 that supports two TBs as the basis for determining the field content of the DCI_x. In this way, a certain aspect of PDSCH performance is improved without increasing the number of blind detections on the PDCCH.

Alternatively, when a is equal to b, and the search spaces of the DCI format 1_1 for the scheduling serving cell A and the DCI format 1_1 for the scheduling serving cell B overlap, it may be determined through the implicit signaling that the fields in the DCI_x is configured according to the fields of the DCI format 1_1 when only the serving cell A is scheduled, or according to the fields of the DCI format 1_1 when only the serving cell B is scheduled. For example, the serving cell A supports the PDSCH with two TBs, serving cell B supports one TB, and selects to support two TBs The field content of the DCI format 1_1 is selected as the basis for determining the field content in the DCI_x. In this way, a certain aspect of PDSCH performance may be improved without increasing the number of blind detections on the PDCCH.

Example 1.5

When the DCI_x has a new DCI format, the number of bits of the DCI_x is different from that of the existing DCI format. In this way, the number of formats of the PDCCH to be blindly detected is increased by one, which may make the total number of formats of the PDCCH that are blindly detected by the UE exceeds the maximum PDCCH blind detection capability of the UE, or make the times that the UE performs blind detection on the PDCCH exceeds the maximum PDCCH blind detection capability of the UE. Measures are taken to ensure that the total number of formats of the PDCCH that are blindly detected by the UE does not exceed the maximum PDCCH blind detection capability of the UE, and the times that the UE performs blind detections on the PDCCH does not exceed the maximum PDCCH blind detection capability of the UE. The following method may be used.

When the total number of formats of the PDCCH that are blindly detected by the UE does not exceed the maximum PDCCH blind detection capability of the UE, the UE blindly detects DCI_x and other DCI formats respectively. When the total number of formats of the PDCCH that are blindly detected by the UE exceeds the maximum PDCCH blind detection capability of the UE, a blind detection on the DCI_x and a blind detection on another DCI format may be combined by the UE. That is, by performing zero padding or truncation on the bits of the DCI_x, the number of bits in the zero padded or truncated DCI_x is the same as the number of bits in another DCI format that need to be blindly detected. Thus, complexity of blind detection may be reduced, so that the number of formats of the PDCCH to be blindly detected by the UE may not exceed the maximum PDCCH blind detection capability of the UE. For example, by combining DCI_x with the DCI format which has the largest number of bits among other DCI formats blindly detected by the UE, that is, the number of bits in the zero padded DCI_x is the same as that in the DCI format with the largest number of bits among other DCI formats. In this way, the number of extra bits may be added as little as possible, and the scheduling performance is not affected.

It should be noted that in practical disclosures, when the base station sends, to the UE, the DCI_x provided in the embodiment of the present disclosure, for different methods for configuring the number of bits of the DCI_x, different DCI_x processing methods x may be determined according to predetermined protocols and/or according to the instructions of the base station when the UE receiving the DCI_x or receiving data transmitted by PDSCH according to DCI_x.

Optionally, for example, when the number of bits of the DCI_x is different from any existing number of bits, the base station may send corresponding indicator information to the UE, and the UE may determine the number of bits of the DCI_x based on the indicator information, thereby performing blind detection on the DCI_x. For another example, when the optional solution in the above Example 1 is used again, since the number of bits of the DCI_x is the same as the number of bits in an existing specific DCI format, the UE has been blindly checking the DCI in the existing format of each serving cell, if the base station issues the DCI_x, the DCI_x can also be blindly detected by the UE, and the UE can determine the number of DCI_x bits by analyzing the DCI_x according to the DCI_x configuration method used. For example, when the number of bits of the DCI format 1_1 with a large number of bits among DCI formats 1_1 of the scheduled serving cells is selected as the number of bits of the DCI_x according to Example 1.1, after the respective serving cells scheduled by the DCI_x is determined by the UE, if the scheduled serving cells are the serving cells A and B, the larger number of bits among the numbers of bits of the DCI format 1_1 of the serving cells A and B may be determined as the number of bits of the DCI_x. The DCI_x may be further analyzed, and user data transmitted in the scheduled PDSCH may be received according to the analysis result.

In addition, in practical disclosures, for one UE, there may be multiple serving cells. As another alternative, the number of bits of the DCI_x may be agreed as the number of bits of DCI in a certain existing format of a serving cell satisfying a certain condition, regardless of the number of serving cells for the UE. For example, it may be supposed that there are three serving cells for the UE, the number of bits of the DCI_x may be equal to the number of bits of the DCI format 1_1 of a serving cell with the smallest cell index among the three serving cells for the UE, or equal to the number of bits of the DCI format 1_1 of a serving cell with the largest cell index among serving cells current scheduled by the DCI_x, regardless of how many serving cells' PDSCHs are scheduled by the DCI_x.

In an optional embodiment of the present disclosure, the specific DCI includes a predetermined field, and the predetermined field is used to indicate the second serving cell scheduled by the specific DCI;

wherein, the predetermined field may be a newly defined field or a redefined field contained in existing DCI.

In the following description, for convenience, the foregoing predetermined field used to indicate the serving cell scheduled by the DCI_x is referred to as a scheduled cell indicator field. It is understandable that the name of this field is not limited in this embodiment of the present disclosure.

Since the DCI_x may be used to schedule the PDSCH of one or more serving cells, when the DCI_x may correspond to one or more scheduled serving cells, it is necessary to provide method for a UE to determine whether the number of serving cells scheduled by the DCI_x is one or more, and which serving cell's PDSCH is specifically scheduled. In the solution according to the embodiment of the present disclosure, the UE may determine the related information of the serving cell scheduled by the DCI_x according to the above-mentioned scheduled cell indicator field in the DCI_x.

Wherein, when the scheduled cell indicator field is a newly defined field, the name of the field is not limited in this embodiment of the present disclosure, and when the scheduled cell indicator field is a field contained in the existing DCI, the fact that which field to be reinterpreted to indicate the serving cell scheduled by the DCI_x is not limited in the embodiment of the present disclosure.

Of course, in practical disclosures, the DCI_x may also be configured as the DCI specifically used to schedule PDSCHs of at least two serving cells. For example, the existing DCI is used to schedule PDSCH of one serving cell, and the DCI_x is used to schedule PDSCHs of two serving cells. In other words, different DCI formats may be used to determine whether the DCI is used to schedule one or two PDSCHs.

The above-mentioned scheduled cell indicator field will be further described combining with an example.

Example 2

In this example, the DCI_x may be used to schedule PDSCH of one serving cell or PDSCHs of two serving cells.

As an optional solution, an independent field such as a newly defined field in the DCI_x or a field contained in the existing DCI may be used and reinterpreted to indicate whether a PDSCH of one serving cell or PDSCHs of two serving cells are scheduled, as well as which serving cell's PDSCH or which two serving cells' PDSCHs are scheduled by the DCI_x.

For example, it is possible to reinterpret the carrier indicator (CI) to indicate whether the DCI schedules PDSCH of one serving cell or PDSCHs of two serving cells, and can further determine PDSCHs of which serving cell or cells are scheduled.

As an illustrative example, Table 2 shows a mapping relationship between values of the CI field and the scheduled serving cells (the serving cell corresponding to PDSCH shown in the Table). In practical disclosures, the base station may indicate the mapping relationship to the UE. When the UE receives the DCI_x, the number of serving cells and which serving cell or cells that are scheduled by the DCI_x may be determined based on the value of the CI field in the DCI_x and the mapping relationship. With this method, the function of scheduling indication may be realized in the case of relatively small protocol changes.

TABLE 2

| CI value | serving cell(s) corresponding to PDSCH |
|---|---|
| 000 | serving cell 0 |
| 001 | serving cell 1 |
| 010 | serving cell 2 |
| 011 | serving cell 0 and serving cell 1 |
| 100 | serving cell 0 and serving cell 2 |
| 101 | serving cell 1 and serving cell 2 |
| 110 | reserved |
| 111 | reserved |

It should be noted that the method shown in Table 2 is only a schematic description. The "reserved" in the above Table 2 means that the CI field values "110" and "111" are not used in this example. And in actual disclosures, the two values "110" and "111" may also be used to indicate other information.

Based on the solution in this example, when the UE receives the DCI_x, it may use fields in the DCI_x to determine whether the DCI schedules PDSCH of one serving cell or PDSCHs of two serving cells, and can further determine which serving cell or cells are scheduled.

In an optional embodiment of the present disclosure, the specific DCI may include at least one of the following indicator fields:

BWP indicator field;

Minimum Applicable Scheduling Offset Indicator (MASOI) field;

Rate Matching Indicator (RMI) field;

Zero Power Channel State Information-Reference Signal resource trigger (ZCRT) field;

Antenna Port (AP) field;

Modulation and Coding Scheme (MCS) field;

New Data Indicator (NDI) field;

Redundancy Version (RV) field.

For a basic description of the indicator fields, it is referred 3GPP TS 38.212 standard.

It can be understood that, the DCI_x may further include other fields contained in existing DCI used to schedule PDSCH in addition to the fields listed above. Definition or configuration of other fields can refer to definition or configuration of each of the above fields hereinafter.

Wherein, functions of the above-mentioned fields can refer to the existing regulations, and will not be expanded here. The difference from functions of the above-mentioned fields in the existing DCI is that the information indicated by the above-mentioned fields in the existing DCI is for one serving cell, and the information indicated by the above-mentioned fields in the DCI_x according to the embodiments of the present disclosure may be for one serving cell or may be for multiple serving cells.

In practical disclosures, for any indicator field contained in DCI_x, the UE may determine whether the field is used for indicating one serving cell or two serving cells by obtaining indicator information from the base station. When the field is used for indicating two or more serving cells, the UE may further obtain the corresponding relationship between the field and respective serving cells from the base station. Based on the corresponding relationship between the indicator value of the field and the corresponding relationship, the UE may determine an indication that this field corresponds to the each serving cell it indicates. Optionally, the base station may send corresponding indicator information and the corresponding information that the UE needs to obtain from the base station when determining which fields in the DCI_x are specifically used to indicate which serving cell, to the UE through high-layer signaling or other means.

In an optional embodiment of the present disclosure, for any of the above-mentioned BWP indicator field, MASOI field, RMI field, ZCRT field, AP field, MCS field, NDI field, or RV field, the number of the field is equal to the number of the second serving cells, and one field corresponds to one second serving cell.

In this optional solution, the number of fields of each type in the DCI_x may correspond to the number of serving cells scheduled by the DCI_x, so that one of the fields of each type can correspond to one scheduled serving cell. In this way, since each scheduled serving cell corresponds to a respective field, the PDSCH performance of each scheduled serving cell may be guaranteed. For example, taking the MCS field as an example, the DCI_x is used to schedule PDSCHs of the serving cells 1 and 2, and the number of MCS fields in the DCI_x is two. The first MSC field corresponds to the serving cell 1, that is, the first MSC field is used to indicate the serving cell 1, and the second MSC field corresponds to the serving cell 2.

Of course, the number of each of the above fields in DCI_x may be only one. When the DCI_x only used to schedule PDSCH of one serving cell, each of the fields indicate the relevant information of this serving cell.

In an optional embodiment of the present disclosure, for any one of the BWP indicator field or the MASOI field, if the number of this fields contained in the specific DCI is less than the number of the second serving cell, the field satisfies at least one of the following:

a. at least one of this fields is used for indicating indicator information corresponding to the field of at least two cells among the at least two second serving cells;

b. this field is not used for indicating indicator information corresponding to this field of any one of the second serving cells;

c. this field is used for indicating the indicator information corresponding to this field of a specific serving cell among the at least two second serving cells;

d. this field is used for indicating the specific message of at least one of the at least two second serving cells.

Specifically, taking the BWP indicator field as an example, the BWP indicator field is used for indicating the switching between the BWPs of the serving cells. It may be assumed that there is only one BWP indicator field in the DCI_x, and the DCI_x is used to schedule PDSCHs of two serving cells. For the above a, the one BWP indicator field may be used for indicating the BWP switching of the two scheduled serving cells at the same time. For example, when the indexes of the BWPs over which the two scheduled serving cells are handed are the same, they may be simultaneously indicated by this BWP indicator field. For another example, mapping relationship between the BWP indicator value and the BWP indexes of the two scheduled cells may be configured. When a BWP indicator value is obtained by the UE, the indexes of the BWPs over which the two scheduled serving cells are handed may be determined based on the indicator value and the mapping relationship.

Optionally, the foregoing specific serving cell may include at least one of the following:

a first serving cell, wherein, the at least one second serving cells include the first serving cell;

a serving cell corresponding to the existing DCI used to determine the number of bits of the specific DCI;

a serving cell satisfying a fourth preset condition.

The fourth preset condition described above may be configured as required. For example, the preset condition may be the same as the second preset condition mentioned above, or may be different.

The optional method for configuring the BWP switching field and the MASOI field will be described combining with two examples as follows. It should be noted that the examples of different fields, that is, the configuration principles may be referred to by each other.

Example 3

The following is a description of the BWP indication method. Currently, a BWP indicator field in the DCI format 1_1 is used to indicate the switching between multiple BWPs configured in one cell, and when the DCI in one PDCCH schedules the PDSCH of two serving cells, methods for indicating the BWP switching may be illustrated as follows.

Example 3.1

In this example, taking that only one BWP indicator field is contained in the DCI_x as an example to describe.

When PDSCH of only one serving cell is scheduled by the DCI_x, the BWP indicator field indicates switching between the BWPs of the scheduled serving cell.

Optionally, when PDSCHs of two serving cells are scheduled by the DCI_x, the BWP indicator field indicates switching between the BWPs of a specific serving cell, and the active downlink BWP of the other serving cell remains unchanged. For example, the BWP indicator field indicates switching between the BWPs of the serving cell to which the PDCCH corresponding. It may be assumed that the PDCCH of the serving cell A can schedule PDSCHs of the serving cells A and B simultaneously, and the BWP indicator field in the DCI in the PDCCH indicates the transformation of the BWP of the serving cell A. In this way, the BWP switching of one serving cell may be indicated simultaneously without increasing the number of bits in the BWP indicator field.

Alternatively, the PDCCH of serving cell A can schedule the serving cell A and the serving cell B, the number of bits of the DCI format 1_1 of the scheduling serving cell A is a, the number of bits of DCI format 1_1 of scheduling serving cell B is b, and the number bits of the DCI_x scheduling the serving cell A and the serving cell B simultaneously may be determined as a, that is, the number bits of the DCI_x is the same as the number of bits of the DCI format 1_1 of the scheduling serving cell A. Of course, the number bits of the DCI_x may also be determined as b, the same as the number of bits of DCI format 1_1 of scheduling serving cell B. As an optional solution, when the number of bits of the DCI_x is the same as that in the DCI format 1_1 of the scheduling serving cell A, the BWP indicator field may indicate the switching between the BWPs of the serving cell A; when the number of bits of the DCI_x is the same as that in the DCI format 1_1 of the scheduling serving cell B, the BWP indicator field may indicate the switching between the BWPs of the serving cell B. In this way, the base station can indicate the BWP switching of any one of the two serving cells by selecting the number of bits of the DCI_x, without increasing the number of bits of the BWP indicator field.

Optionally, when PDSCHs of two serving cells are scheduled by the DCI_x, the BWP indicator field indicates the switching between the BWPs of a specific serving cell determined by implicit signaling, and the active downlink BWP of the other serving cell remains unchanged. For example, the BWP indicator field indicates the switching between the BWPs of the serving cell with a small cell index (or a large cell index). In this way, when PDSCHs of two serving cells are scheduled by one DCI, the BWP indicator field can indicate the BWP switching of one serving cell simultaneously, without increasing the bit number thereof.

Optionally, when PDSCHs of two serving cells are scheduled by the DCI_x, the BWP indicator field indicates the switching between BWPs of the two scheduled serving cells, and the indexes of the BWPs over which the two serving cells are handed are the same.

Optionally, when PDSCHs of two serving cells are scheduled by the DCI_x, the BWP indicator field may jointly indicate the switching between BWPs of the two scheduled serving cells. As an optional manner, Table 3 shows mapping relationship between the indicator value of a BWP indicator field (the BWP indicator value shown in the Table) and indexes of BMPs (a0~a3, b0~b3, etc. shown in the Table) over which each scheduled serving cell (serving cell 1 and serving cell 2 are used as examples) is handed.

TABLE 3

| BWP indicator value | BWP of serving cell 1 | BWP of serving cell 2 |
|---|---|---|
| 00 | BWP a0 | BWP b0 |
| 01 | BWP a1 | BWP b1 |
| 10 | BWP a2 | BWP b2 |
| 11 | BWP a3 | BWP b3 |

Specifically, the base station may indicate the mapping relationship to the UE. When the DCI_x is received by the UE, the indexes of BMPs over which the serving cells 1 and 2 are handed may be determined respectively based on the indicator value of the BMP indicator field in the DCI_x and the mapping relationship.

Optionally, when PDSCHs of two serving cells are scheduled by the DCI_x, the BWP indicator field may be used as a reserved field and does not indicate the switching between the BWPs of the two scheduled serving cells. The active BWP of the two serving cells keep unchanged, or the BWP indicator field may be used as indication of other information, for example, as antenna port indication, so that more bits may be used for antenna port indication, and the antenna port may be changed more flexibly, and the performance of the scheduled PDSCH may be better.

Example 3.2

In this example, taking that two BWP indicator fields are contained in the DCI_x and the DCI_x is used for indicating PDSCHs of two serving cells as an example to describe.

Specifically, there may be two BWP indicator fields in the DCI_x, each field indicating the BWP switching of a scheduled serving cell, that is, one BWP indicator field corresponds to one scheduled cell. For example, a first BWP indicator field indicates the BWP switching of the serving cell 1, and a second BWP indicator field indicates the BWP switching of the serving cell 2. In this way, the BWP switching can be very flexible, and the performance of the PDSCH of the scheduled serving cell can be better.

Example 3.3

When PDSCHs of two serving cells are scheduled by the DCI_x, the extended BWP indicator field can jointly indicate the switching between the BWPs of the two scheduled serving cells. That is, there can still be only one BWP indicator field, and the number of bits in the BWP indicator field increased. For example, the number of bits in the BWP indicator field may be 3 bits, and the different indicator values of these 3 bits may be used to indicate the BWPs of two serving cells. By extending the number of bits, the base station can provide better indications for the UE more flexibly and improve the scheduling performance of PDSCH. As an optional method, Table 4 shows mapping relationship between the indicator value of a BWP indicator field (BWP indicator value shown in the Table) and index of BWP over which each scheduled serving cell (serving cell 1 and serving cell 2 are used as examples in Table 4) are handed. As shown in the Table, 3-bit BWP indicator field may corresponds to 8 different joint indicator information.

Compared with the 2-bit indicator field, the scheduling performance can be improved significantly.

TABLE 4

| BWP indicator value | BWP of serving cell 1 | BWP of serving cell 2 |
|---|---|---|
| 000 | BWP a0 | BWP b0 |
| 001 | BWP a1 | BWP b1 |
| 010 | BWP a2 | BWP b2 |
| 011 | BWP a3 | BWP b3 |
| 100 | BWP a4 | BWP b4 |
| 101 | BWP a5 | BWP b5 |
| 110 | BWP a6 | BWP b6 |
| 111 | BWP a7 | BWP b7 |

Specifically, the base station may indicate the mapping relationship to the UE. When the DCI_x is received by the UE, the indexes of BMPs over which the serving cells 1 and 2 are handed may be determined respectively based on the indicator value of the BMP indicator field in the DCI_x and the mapping relationship.

Example 4

The following examples are used to describe the indication method of MASOI. Currently, a MASOI indicator field is contained in the DCI format 1_1 which is used for indicating MASOI of active BWPs in one cell. When DCI in a PDCCH can schedule PDSCH of one or more serving cells, several optional methods described below can be used to indicate MASOI. In the following examples, taking that the DCI_x schedules a PDSCH of one serving cell or schedules PDSCHs of two serving cells as an example to describe.

Example 4.1

For each optional solution in this example, taking that only one MASOI indicator field (that is, the MASOI field mentioned above) is contained in the DCI_x as an example.

Optionally, when DCI_x only schedules the PDSCH of one serving cell, the MASOI indicator field indicates the MASOI of the active BWP of the scheduled serving cell.

Optionally, when the DCI_x schedules the PDSCHs of two serving cells, the MASOI indicator field may be used to indicate the MASOI of the active BWP of the specific serving cell, and the MASOI of the active downlink BWP of the other serving cell remains unchanged. For example, the MASOI indicator field may indicate the MASOI of the active BWP of the serving cell to which the PDCCH corresponds. Assuming that the PDCCH of the serving cell A schedules the PDSCH of the serving cell A and the PDSCH of the serving cell B simultaneously, the MASOI indicator field in the DCI_x in the PDCCH indicates the MASOIs of the active BWP of the serving cell A. In this way, the MASOI of the active BWPs of one serving cell can be indicated simultaneously, without increasing the number of bits in the MASOI indicator field.

Alternatively, the PDCCH of the serving cell A can schedule the PDSCHs of the serving cells A and B, the number of bits of the DCI format 1_1 of the scheduling serving cell A is a, and the number of bits of DCI format 1_1 of the scheduling serving cell B is b, and the number of bits of the DCI_x scheduling the serving cell A and the serving cell B, simultaneously may be determined as a, the same as the number of bits of the DCI format 1_1 of the scheduling serving cell A; the number of bits of the DCI_x may also be determined as b, the same as the number of bits of DCI format 1_1 of the scheduling serving cell B. Wherein, when the number of bits of the DCI_x is the same as the number of bits of the DCI format 1_1 of the scheduling serving cell A, the MASOI indicator field indicates the MASOI of the active BWP of the serving cell A; when the number of bits of the DCI_x is the same as the number of bits of the DCI format 1_1 of the scheduling serving cell B, the MASOI indicator field indicates the MASOI of the active BWP of the serving cell B. In this way, without increasing the number of bits in the MASOI indicator field, the base station can indicate the MASOI of the active BWP of any one of the two serving cells by selecting the number of bits of the DCI_x. Correspondingly, the UE can determine MASOI of active BWP of which serving cell is indicated by the MASOI indication field according to the number of bits of the DCI_x.

Optionally, when PDSCHs of two serving cells are scheduled by the DCI_x, the MASOI indicator field may indicate the MASOI of the active BWP of the specific serving cell, and the MASOI of the active downlink BWP of the other serving cell remains unchanged. For example, the MASOI indicator field indicates the MASOI of the active BWP of a serving cell with a small cell index. In this way, it is possible to indicate the MASOI of active BMPs of one serving cell simultaneously without increasing the number of bits in the MASOI indicator field.

Optionally, when PDSCHs of two serving cells are scheduled by the DCI_x, the MASOI indicator field may jointly indicate the MASOI of active BWPs of two scheduled serving cells. As an optional method, Table 5 shows a mapping relationship between the indicator value of a MASOI indicator field (the MASOI indicator value in the Table) and MASOI of active BWPs of each schedule serving cell (serving cell 1 and serving cell 2 shown in the Table). In the indication disclosure, the base station can indicate the mapping relationship to the UE, and the specific manner in which the base station informs the UE of the mapping relationship is not limited in this disclosure. After the DCI_x is received by the UE, the index of MASOI of each scheduled serving cell may be determined based on the indicator value of the MASOI indicator field in the DCI_x and the mapping relationship. For example, when the MASOI indicator value is 00, the index of the MASOI of the serving cell 1 is c0, and the index of the MASOI of the serving cell 2 is d0.

TABLE 5

| MASOI indicator value | MASOI of serving cell 1 | MASOI of serving cell 2 |
|---|---|---|
| 00 | MASOI c0 | MASOI d0 |
| 01 | MASOI c1 | MASOI d1 |
| 10 | MASOI c2 | MASOI d2 |
| 11 | MASOI c3 | MASOI d3 |

Optionally, when PDSCHs of two serving cells are schedule by the DCI_x, the MASOI indicator field is used as a reserved field, that is, this field may not indicate the MASOI of active BWPs of the two schedule serving cells, and the MASOI of active BWPs of the two serving cells remains unchanged. Alternatively, the MASOI indicator field may be used for other information indications, for example, for antenna port indication, which can make antenna port changes more flexible and PDSCH performance better.

Example 4.2

There are two MASOI indicator fields in the DCI_x. The DCI_x is used to schedule the PDSCHs of two serving cells.

Each field indicates the MASOI of active BWPs of one scheduled serving cell, and one MASOI indicator field corresponds to one scheduled serving cell. Using this method can make the changes of MASOI very flexible, and the performance of PDSCH is better.

Example 4.3

The principle of this example is the same as the principle in the previous Example 3.3. By increasing the number of bits in the MASOI indicator field, one MASOI indicator field can indicate the MASOI of active BMPs of multiple serving cells. Since the principle is the same as the previous Example 3.3, the description will not be repeated here, that is, in Example 3.3, an extended BWP indicator field is used to jointly indicate the BWP switching of multiple serving cells. It is also possible to apply to the MASOI indicator field, an extended MASOI indicator field is used to jointly indicate the MASOI of the active BWPs of multiple serving cells.

In an optional embodiment of the present disclosure, for any one type of the RMI field, ZCRT field, AP field, MCS field, NDI field, or RV field, if the number of this type of field contained in the specific DCI is less than the number of the second serving cells, this type of field is used to indicate information of each second serving cell, and at least one of this type of field is used to jointly indicate information corresponding to this field of at least two second serving cells.

In other words, with respect to one type of fields, if the number of fields is less than the number of serving cells scheduled by the DCI_x, at least one among this type of fields needs to be used to jointly indicate information corresponding to at least two serving cells to ensure that each scheduled serving cell can be indicated. For example, taking the RMI field as an example, there is only one RMI field in the DCI_x, and the DCI_x schedules the PDSCHs of two serving cells, the RMI field may be used to jointly indicate the RMIs of the two serving cells.

The RMI field, the ZCRT field, the AP field, the MCS field, the NDI field, and the RV field will be further described below, respectively, in conjunction with some examples. In the following examples, taking that the DCI_x is used to schedule the PDSCH of one serving cell or the PDSCHs of two serving cells as an example for description.

Example 5

The RMI indication method will be described as below. Currently, DCI format 1_1 contains a RMI indicator field (that is, the above-mentioned RMI field) used to indicate the RMI of the active BWP in one cell. When the DCI in one PDCCH can schedule the PDSCHs in two serving cells, there are several optional ways to indicate RMI in the following examples.

Example 5.1

In this example, taking that there is only one RMI indicator field in the DCI_x as an example for description.

Optionally, when the DCI_x only schedules the PDSCH of one serving cell, the RMI indicator field indicates the RMI of active BWPs of the scheduled serving cell. As an optional method, Table 6 shows a mapping relationship of indicator values of the RMI indicator field (RMI indicator values shown in the Table 6) and values of the RMI indicator field (e0~e3 as shown in the Table 6) corresponding to each indicator value. When the DCI_x only schedules the PDSCH of one serving cell, the UE can obtain the value of the RMI indicator field of the active BWP of the scheduled serving cell according to the indicator value of the RMI indicator field in the DCI_x and the mapping relationship.

TABLE 6

| RMI indicator value | RMI of serving cell |
|---|---|
| 00 | RMI e0 |
| 01 | RMI e1 |
| 10 | RMI e2 |
| 11 | RMI e3 |

Optionally, when the DCI_x schedules the PDSCHs of two serving cells, the RMI indicator field may jointly indicate the RMI of the active BMPs of the two scheduled serving cells. As an optional manner, Table 7 shows a mapping relationship between the indicator value of the RMI indicator field (RMI indicator value shown in the Table 7) and the value of the RMI indicator field of the active BMPs of each serving cell. Wherein, the mapping relationship may be obtained through the high-layer signaling configuration of the base station or other configuration methods. The RMI status may include non-rate matching, that is, the RMI indicator field indicates that the serving cell does not perform rate matching, that is, the RMI indicator field may indicate a rate matching pattern, or indicate that the rate matching may not be performed. In this way, the rate matching of the two serving cells may be indicated without increasing the number of bits in the RMI indicator field.

TABLE 7

| RMI indicator value | RMI of serving cell 1 | RMI of serving cell 2 |
|---|---|---|
| 00 | RMI f0 | RMI g0 |
| 01 | RMI f1 | RMI g1 |
| 10 | RMI f2 | RMI g2 |
| 11 | RMI f3 | RMI g3 |

Wherein, in practical disclosures, the RMI indicator value when the DCI_x scheduling the PDSCH of one serving cell may be the same or different from the RMI indicator value when the DCI_x scheduling the PDSCH of two serving cells. Optionally, in order to save resources, the RMI indicator value when the DCI_x scheduling the PDSCH of one serving cell and the RMI indicator value when the DCI_x scheduling the PDSCHs of two serving cells can use the same optional value, such as 00, 01, 10 and 11 shown in Table 6 and Table 7. However, when the numbers of scheduled cells are different, the RMI indicated by the same RMI indicator value may be configured independently, that is, although the RMI indicator value can use the same optional value, the same RMI indicator value when the DCI_x scheduling the PDSCH of one serving cell and when the DCI_x scheduling the PDSCHs of two serving cells, the indicated RMIs are different, one indicates one serving cell, and the other indicates two serving cells jointly. In this way, the UE can first determine whether DCI_x is used to schedule the PDSCH of one serving cell or the PDSCHs of two serving cells. When there is one scheduled serving cell, the RMI of the scheduled serving cell mat be determined according to RMI indicator value and the mapping relationship corresponding to one scheduled serving cell (as shown in Table 6). When there are two scheduled serving cells, the RMI of the scheduled serving cell mat be determined according to RMI indicator value and the mapping relationship corresponding to two scheduled serving cells (as shown in Table 7). With this optional method, it may be ensured that when one serving cell is scheduled, the RMI indication is the most accurate, and when two serving cells are scheduled, the RMI indication is the result of a comprehensive optimization of scheduling PDSCH and the RMI indication.

Example 5.2

There are two RMI indicator fields in the DCI_x. When the DCI_x is used to schedule the PDSCHs of two serving cells, each field indicates the RMI of active BWPs of one scheduled serving cell, that is, each RMI indicator field can correspond to a scheduled service cell. In this way, RMI changing may be very flexible.

Optionally, there is only one RMI indicator field in the DCI_x. When the DCI_x is used to schedule the PDSCHs of two serving cells, the RMI indicator field may indicate the RMI of active BWPs of one serving cell, and the RMI of active BWPs of the other serving cell may be indicated by reusing other fields, such as by reusing the BWP indicator field or the MASOI field.

Example 5.3

The principle of this example is the same as that in Example 3.3 or Example 4.4 above, that is, an extended RMI indicator field may be used to jointly indicate the RMI of active BWPs of multiple serving cells. For specific optional implementations, reference may be made to the description in Example 3.3 above, which will not be expanded here.

Example 6

The ZCRT indication method will be described as below. Currently, the DCI format 1_1 contains a ZCRT indicator field used to indicate the ZCRT of active BWPs within one cell. When the DCI in one PDCCH schedules the PDSCHs in two serving cells, there are several optional ways to indicate ZCRT in the following examples.

Example 6.1

In this example, there is only one ZCRT indicator field in DCI_x for description.

Optionally, when the DCI_x only schedules the PDSCH of one serving cell, the ZCRT indicator field is used to indicate the ZCRT of active BWPs of the scheduled serving cell. As an optional way, Table 8 shows a mapping relationship between indicator values the ZCRT indicator field (ZCRT indicator value in the Table 8) and the ZCRT of active BWPs of the scheduled serving cell (serving cell 1 is taken as an example in the Table). When the UE receiving the DCI_x, the ZCRT of the scheduled serving cell may be determined based on the indicator value of the ZCRT indicator field in the DCI_x and the mapping relationship.

TABLE 8

| ZCRT indicator value | ZCRT of serving cell 1 |
|---|---|
| 00 | ZCRT h0 |
| 01 | ZCRT h1 |
| 10 | ZCRT h2 |
| 11 | ZCRT h3 |

Optionally, when the DCI_x schedules the PDSCHs of two serving cells, the ZCRT indicator field may jointly indicate the ZCRT of the active BWPs of the two scheduled serving cells. As an optional method, Table 9 shows a mapping relationship between a ZCRT indicator value and the ZCRT of the active BWPs of two scheduled serving cells (serving cell 1 and serving cell 2 are taken as examples in the Table 9). Wherein, the ZCRT status indicated by each indicator value may be obtained by the UE using the high-layer signaling configuration of the base station or other methods. The ZCRT status may include non-ZP CSI-RS, that is, the ZCRT is used to indicate that there is no ZP CSI-RS resource in the PDSCH scheduled by the activated BWP in the cell. In this way, the zero-power channel state information reference signal driving of the two serving cells may be indicated without increasing the number of bits in the ZCRT indicator field.

TABLE 9

| ZCRT indicator value | ZCRT of serving cell 1 | ZCRT of serving cell 2 |
|---|---|---|
| 00 | ZCRT m0 | ZCRT n0 |
| 01 | ZCRT m1 | ZCRT n1 |
| 10 | ZCRT m2 | ZCRT n2 |
| 11 | ZCRT m3 | ZCRT n3 |

The same as the indication principle of the RMI indicator field, when the DCI_x schedules the PDSCH of one serving cell and the DCI_x schedules the PDSCHs of two serving cells, the optional values of the ZCRT indicator value may be the same or different. If the same, the ZCRTs indicated by the same ZCRT indicator value may be configured independently. Which can ensure that when scheduling one serving cell, the ZCRT indication is the most accurate, and when scheduling two serving cells, the ZCRT indication is the result of a comprehensive optimization of scheduled PDSCH and the ZCRT indication.

Example 6.2

When there are two ZCRT indicator fields in the DCI_x, and the DCI_x schedules the PDSCHs of two serving cells, each of the ZCRT indicator fields indicates the ZCRT of active BWPs of one scheduled serving cell, that is, each scheduled serving cell corresponds to one ZCRT indicator field. In this way, the ZCRT changing may be very flexible.

Optionally, when there is only one ZCRT indicator field in the DCI_x and the DCI_x schedules the PDSCHs of two serving cells, the ZCRT field in the DCI_x can indicate the ZCRT of the active BWPs of one scheduled serving cell, and the ZCRT of the active BWPs of the other scheduled serving cell may be indicated by reusing other fields, for example, by reusing the BWP indicator field or the MASOI field to indicate the ZCRT of the active BWPs of the other scheduled serving cell.

Example 6.3

The principle of this example is the same as the principle in the previous Example 3.3, that is, an extended ZCRT indicator field may be used to jointly indicate the ZCRT of active BWPs of multiple serving cells. For specific optional implementations, reference may be made to the description in Example 3.3 above, which will not be expanded here.

Example 7

The indication method of the antenna port AP may be described as bellow. Currently, the DCI format 1_1 contains the AP indicator field used to indicate the AP of active BWPs within one cell. When the DCI in one PDCCH can schedule the PDSCH in one or more serving cells, there are several optional ways to indicate AP in the following examples. In the following example, taking that the DCI_x schedules the PDSCH of one serving cell or schedules the PDSCHs of two serving cells as an example for description.

Example 7.1

In this example, taking that there is only one AP indicator field in the DCI_x to describe.

Optionally, when the DCI_x only scheduling the PDSCH of one serving cell, the AP indicator field indicates the AP of active BWPs of the scheduled serving cell. As an optional method, Table 10 shows a mapping relationship between the indicator value of the AP indicator field (AP indicator value) and the AP of the serving cell indicated by the indicator value. When the UE receiving the DCI_x, the AP of the scheduled serving cell may be determined based on the AP indicator value in the DCI_x and the mapping relationship. If the indicator value is 00, the indication of the corresponding AP is p0. It is clear to those skilled in the art that the indicator value and p0 and the like in this example represent a schematic representation, and p0 and the like represent a kind of AP set, and the ports in the set are the ports of the scheduled serving cell.

TABLE 10

| AP indicator value | AP of serving cell 1 |
|---|---|
| 00 | AP p0 |
| 01 | AP p1 |
| 10 | AP p2 |
| 11 | AP p3 |

Optionally, when the DCI_x schedules the PDSCHs of two serving cells, the AP indicator field jointly indicates the APs of the active BWPs of the two scheduled serving cells, and the APs of the active BWPs of each serving cell are shown in Table 11. With this method, the antenna ports of two serving cells may be indicated without increasing the number of bits in the AP indicator field.

TABLE 11

| AP indicator value | AP of serving cell 1 | AP of serving cell 2 |
|---|---|---|
| 00 | AP s0 | AP t0 |
| 01 | AP s1 | AP t1 |
| 10 | AP s2 | AP t2 |
| 11 | AP s3 | AP t3 |

Example 7.2

When there are two AP indicator fields in the DCI_x, and the DCI_x is used to schedule the PDSCHs of two serving cells, each AP indicator field can indicate the AP of active BWPs of one scheduled serving cell, that is, each scheduled serving cell corresponds to one AP indicator field. In this way, AP changing may be very flexible.

Optionally, when there are only two AP indicator fields in the DCI_x, for the AP indication of the active BWPs of the scheduled serving cell, one of the AP indicator fields may be the AP indicator field in the DCI_x, and the other AP indicator field may be obtained by reusing other fields, for example, by reusing the BWP indicator field or the MASOI field, or by increasing the number of bits of the DCI_x so that the DCI_x includes two AP indicator fields.

Example 7.3

The principle of this example is the same as that in Example 3.3 above, that is, an extended AP indicator field may be used to jointly indicate the AP of active BWPs of multiple serving cells. For specific optional implementations, reference may be made to the description in Example 3.3 above, which will not be expanded here.

Example 8

The indication methods of MCS, NDI and RV may be described as below. At present, in the DCI format 1_1, there is a set of MCS, NDI, and RV indicator fields configured according to signaling, or there are two sets of MCS, NDI, and RV indicator fields to indicate the MCS, NDI and RV of the active BWPs within one cell. When the DCI in one PDCCH can schedule PDSCH in one or more serving cells, there are several optional ways to indicate the MCS, NDI and RV in the following examples. In the following example, taking that the DCI_x schedules the PDSCH of one serving cell or schedules the PDSCHs of two serving cells as an example for description.

Example 8.1

Optionally, when the DCI_x only schedules the PDSCH of one serving cell, the MCS, NDI and RV indicator fields in the DCI_x indicate the MCS, NDI and RV of the active BWPs of the scheduled serving cell.

Optionally, when DCI_x schedules the PDSCHs of two serving cells, and there is a set of MCS, NDI, RV indicator fields in the DCI_x, the set of MCS, NDI, RV indicator fields can indicate that the MCS, NDI, RV of active BWPs of the respective two scheduled serving cells are the same. For example, in the example provided above, indicator values of the set of MCS, NDI, RV indicator fields can jointly indicate the MCS, NDI and RV of the active BWPs of the respective two scheduled serving cells. For example, taking the MCS indicator field as an example, one indicator value of one MCS indicator field can indicate the MCS of the active BWPs of the respective two scheduled serving cells simultaneously.

Optionally, when DCI_x schedules the PDSCHs of two serving cells, and there are two sets of MCS, NDI, and RV indicator fields in the DCI_x, each set of MCS, NDI, and RV indicator fields can indicate the MCS, NDI, and RV of active BWPs of one scheduled serving cell. For example, the first set of MCS, NDI, RV indicator fields are MCS_1, NDI_1, RV_1, and the MCS, NDI, and RV of the TB in the first scheduled serving cell are indicated by the MCS_1, NDI_1, RV_1 indicator fields, the second set of MCS, NDI, RV indicator fields are MCS_2, NDI_2, RV_2, and the MCS, NDI, RV of the TB in the second scheduled serving cell are indicated by the MCS_2, NDI_2, RV_2 indicator fields.

Optionally, when DCI_x schedules the PDSCHs of two serving cells, and there are two sets of MCS, NDI, and RV indicator fields in the DCI_x, the two sets of MCS, NDI, and RV indicator fields can indicate the MCS, NDI, and RV of different TBs in each active BWPs of one scheduled serving cell, and the same MCS, NDI, and RV can be used for TBs with the same TB index number in different serving cells.

For example, the first set of MCS, NDI, and RV indicator fields are MCS_1, NDI_1, RV_1, the MCS, NDI, and RV of the first TB in the first scheduled serving cell and the first TB in the second scheduled serving cell are indicated by the MCS_1, NDI_1, RV_1 indicator fields, and the second set of MCS, NDI, and RV indicator fields are MCS_2, NDI_2, RV_2, the MCS, NDI, and RV of the second TB in the first scheduled serving cell and the second TB in the second scheduled serving cell are indicated by the MCS_2, NDI_2, RV_2 indicator fields.

Optionally, when DCI_x schedules the PDSCHs of two serving cells, and there are two sets of MCS, NDI, and RV indicator fields in the DCI_x, the two sets of MCS, NDI, and RV indicator fields can indicate the MCS, NDI, and RV of different TBs in each active BWP in one scheduled serving cell. If the numbers of TBs supported by two scheduled serving cells are different, for example, one scheduled serving cell supports two TBs, and the other scheduled serving cell supports one TB. Optionally, the same MCS, NDI, and RV can be used for TBs with the same TB index number in different serving cells. For example, the first set of MCS, NDI, and RV indicator fields are MCS_1, NDI_1, RV_1, the MCS, NDI, and RV of the first TB in the first scheduled serving cell and the first TB in the second scheduled serving cell are indicated by the MCS_1, NDI_1, and RV_1 indicator fields. The second set of MCS, NDI, The RV indicator fields are MCS_2, NDI_2, and RV_2, the MCS, NDI, and RV of the second TB in the first scheduled serving cell are indicated by the MCS_2, NDI_2, and RV_2 indicator fields.

It should be noted that for the optional indication methods of each field in the DCI_x provided in the embodiments of this disclosure, in actual disclosures, the base station and the UE may predetermine that which method is used (which may be provided through protocols). In this way, when content in respective fields in the received DCI_x is obtained through analyzing, the UE may know the scheduled serving cell to which each field corresponds based on the protocol provisions. When a field is used to jointly indicate the information of at least two serving cells, the UE may determine the indicator information of each indicated serving cell corresponding to the field based on the protocol provisions or based on the mapping relationship or other indicator information obtained from the base station.

In addition, for the various fields that may be contained in the DCI_x, the implementation principles of the optional indication methods corresponding to different fields can also be referred to for each field. For example, the configuration principle of the MCS indicator field can also be applied to the configuration of other indicator fields. For another example, the configuration principle of the MASOI indicator field can also be applied to the BWP indicator field.

On the basis of a new DCI provided in the embodiment of this disclosure, the embodiment of this disclosure also provides a method for receiving downlink control link data. The method may be performed by the UE, that is, the UE may receive the DCI from a base station through this method.

FIG. 2 is a schematic flowchart illustrating a method for receiving downlink data according to an embodiment of the present disclosure.

the method as shown in FIG. 2 may include:

Step 201: receiving DCI on a serving cell, that is, receiving a PDCCH on a serving cell;

Step 203: receiving data transmitted by a PDSCH of at least one serving cell scheduled by the DCI according to the DCI, that is, receiving the PDSCH on the at least one serving cell according to information of the DCI in one PDCCH.

Wherein, the DCI received by the UE may include the above-mentioned specific DCI provided in any embodiment of the present disclosure.

It may be seen from the foregoing description that the serving cell where the PDCCH carrying the DCI is located and the serving cell scheduled by the DCI are both serving cells for the UE. The cell scheduled by the DCI may or may not include the serving cell where the PDCCH carrying the DCI is located.

Based on the method provided in the embodiments of the present disclosure, scheduling of one or more PDSCHs may be implemented on one PDCCH, and user data transmitted in the PDSCHs of one or more serving cells may be received based on one DCI, which may reduce resources occupied by the downlink control information transmission based on that the scheduling performance can be guaranteed.

Optionally, the receiving DCI on a first serving cell includes:

receiving DCI in a predetermined format on the one serving cell, and the DCI in the predetermined format can be used to schedule PDSCHs of at least two serving cells.

Wherein, the DCI in the predetermined format is the DCI in a new format provided in the embodiments of the present disclosure. The DCI may be used to schedule the PDSCHs of at least two serving cells. In this way, the effect of scheduling the PDSCHs of multiple serving cells on one PDCCH is realized, and the resources occupied by the PDCCH can be reduced.

Optionally, when the DCI in the predetermined format contains PDSCH information of at least two serving cells, the receiving the data transmitted by the PDSCHs of at least one serving cell scheduled by the DCI according to the DCI includes:

receiving the data transmitted by the PDSCHs of the at least two serving cells scheduled by the DCI according to the DCI.

Since the DCI in the predetermined format may be used to schedule the PDSCHs of the at least two serving cells, when the DCI in the predetermined format contains indicator information corresponding to the PDSCHs of the at least two serving cells, data transmitted by the PDSCHs of the at least two serving cells scheduled by the DCI may be received according to the DCI.

Optionally, the method may further include:

sending Hybrid Automatic Repeat request Acknowledge (HARQ-ACK) information corresponding to PDSCHs of at least one second serving cell.

Wherein, when the DCI in the predetermined format contains PDSCH information of at least two serving cells, the UE may send HARQ-ACK information corresponding to PDSCHs of the at least two serving cells.

Optionally, the receiving the data transmitted by the PDSCHs of at least one serving cell scheduled by the DCI according to the DCI includes:

determining that the DCI is used to schedule the PDSCHs of the at least two serving cells according to an indication of a predetermined field in the DCI; and receiving the data transmitted by the PDSCHs of the at least two serving cells scheduled by the DCI.

Specifically, the DCI in the predetermined format may contain a field for determining whether this DCI is used to schedule PDSCHs of one serving cell or to schedule PDSCHs of at least two serving cells. When the UE determining the DCI is used to schedule PDSCHs of at least two serving cells, data transmitted by the PDSCHs of multiple serving cells scheduled by the DCI may be received according to the field. Wherein, in addition to that the predetermined field can used to determine whether the DCI is used to schedule PDSCHs of one serving cell or to schedule PDSCHs of at least two serving cells, the predetermined field can be used to indicate which serving cell(s) is specifically scheduled by the DCI, so that the UE can receive the data transmitted by the PDSCH of each serving cell scheduled by the DCI.

Optionally, the receiving the data transmitted by the PDSCHs of at least two serving cells scheduled by the DCI includes:

determining a serving cell indicated by each indicator field in the DCI;

determining the indication of the indicator field corresponding to each serving cell in the DCI; and receiving the data transmitted by the PDSCH of each serving cell, according to the indication of the indicator field corresponding to each serving cell in the DCI.

Optionally, the determining the serving cell indicated by each indicator field in the DCI includes:

receiving indicator information corresponding to each indicator field in the DCI;

determining a serving cell indicated by each indicator field in the DCI according to the indicator information.

In practical disclosures, when the DCI in the predetermined format schedules the PDSCHs of at least two serving cells, the UE needs to determine whether each field in the DCI is specifically used to indicate one serving cell or to indicate two serving cells. Thus, the indicator information corresponding to each scheduled serving cell is determined, and data is received according to the indicator information corresponding to each scheduled serving cell.

Optionally, taking that the DCI in the predetermined format is used to schedule two serving cells as an example, the base station and the UE may predetermine whether each indicator field is used for indicating one serving cell or two serving cells when the DCI in the predetermined format is used to schedule two serving cells. For example, taking the BWP indicator field as an example, it may be predetermined that the BWP indicator field is used to indicate two serving cells, and it may also be predetermined which serving cell is specifically indicated, such as the serving cell with the smallest cell index number is indicated. In this way, the UE can determine the serving cell specifically indicated by the BWP indicator field according to the predetermine result.

As another optional method, the UE may obtain corresponding indicator information from the base station, and, determine whether each field in the DCI in the predetermined format is specifically used to indicate one or more serving cells according to the indicator information.

It is understandable that for each field in the DCI in the predetermined format, different fields may be configured with different methods. With respect to different configuration methods, the UE may process different fields differently. For example, some fields are based on the protocol provisions, and some fields are based on indicator information obtained from the base station.

Optionally, for any indicator field in the DCI, when any one of the indicator fields is used to indicate at least two serving cells, the determining indication of the indicator field corresponding to each serving cell in the DCI includes:

receiving a mapping relationship of any indicator field, where the mapping relationship is a corresponding relationship between a field indicator value and the indication of the at least two serving cells;

determining the indication that the indicator field corresponds to each of the at least two serving cells, according to the indicator value of the indicator field and the mapping relationship.

That is, in practical disclosures, when the DCI in the predetermined format is used to schedule the PDSCHs of two or more serving cells, the UE may also receive the corresponding relationship between the indicator field and specific indications of each of scheduled serving cells corresponding to the indicator field from the base station for the indicator field in the DCI. The specific indications of each of scheduled serving cells corresponding to the indicator field may be determined by the UE according to the specific indicator value of the indicator field and the corresponding relationship.

In addition, from the previous description of the specific DCI, it should be noted that since the DCI may be used to schedule the PDSCH of one serving cell, or may be used to schedule the PDSCHs of multiple serving cells. If the DCI is used to schedule multiple PDSCHs, the UE needs to determine a serving cell to which the indicator information of each field in the DCI is corresponding. Alternatively, when the indicator information of a field indicates two serving cells simultaneously, it is necessary to determine what the indicator information for each serving cell is, based on the indicator value of the indicator field. For example, taking the BWP indicator field as an example, when the specific DCI schedules the PDSCHs of two serving cells, the UE needs to determine whether the BWP indicator field is used to indicate BWP switching of which one or two serving cells simultaneously. For example, when there is only one BWP indicator field, if the field indicates two serving cells simultaneously, the specific indication for each serving cell may be determined based on the indication value of the BWP indicator field, as described above, the BWP over which each serving cell is handed is determined based on the indicator value and the mapping relationship.

It is clear to those skilled in the art that for different DCI field configuration methods, when the UE receiving the DCI, a desired analysis method may be used to obtain corresponding information. When the specific DCI in the embodiment of the present disclosure is used to schedule the PDSCHs of multiple serving cells, the indication method of each field in the DCI provided in the optional embodiments above can be referred to, and corresponding analysis method can be used to determine indicator information for each serving cell. For example, when it is necessary to determine the indication for each serving cell based on the indication value of each field and the mapping relationship, the base station may send each mapping relationship to the UE through high-layer signaling or other methods.

In addition, in the downlink data receiving method provided in the embodiment of the present disclosure, for different DCI_x configuration, when receiving user data transmitted by the PDSCH, corresponding data receiving method performed by a UE can also be adjusted based on the specific configuration.

An embodiment of the present disclosure also provides a method for monitoring Physical Downlink Control Channel (PDCCH), which may be performed by a UE. The UE may perform PDCCH monitoring by using this method and receive PDCCH from a base station.

FIG. 3 is a schematic flowchart illustrating a method for monitoring PDCCH according to an embodiment of the present disclosure.

the method as shown in FIG. 3 may include:

Step 301: The UE determines/identifies monitoring information of PDCCH candidates used for scheduling PDSCH/PUSCH in a first serving cell. The monitoring information includes first monitoring information for PDCCH monitoring in the first serving cell and second monitoring information for PDCCH monitoring in a second serving cell.

The first serving cell may be a primary cell or a secondary cell, and the first serving cell may be scheduled by the first serving cell and/or the second serving cell, wherein the second serving cell is at least one secondary cell. That is, the first serving cell is a scheduled cell, the first serving cell and/or the second serving cell are scheduling cells, and the PDCCH used for scheduling the first serving cell may be transmitted in the first serving cell and/or the second serving cell.

In an optional embodiment of the present disclosure, the determined/identified monitoring information of PDCCH candidates used for scheduling PDCCH in the first serving cell includes first monitoring information for PDCCH monitoring performed by the UE in the first serving cell and second monitoring information for PDCCH monitoring performed by the UE in the second serving cell.

It should be noted that the name of each monitoring information (monitoring information, first monitoring information, second monitoring information, etc.) involved in the embodiments of the present disclosure is not unique, and other names may also be used. The monitoring information refers to information related to PDCCH monitoring, which may include, but is not limited to, the number of PDCCH candidates to be monitored and/or the number of non-overlapping Control Channel Elements (CCEs) to be monitored.

Step 303: The UE performs PDCCH monitoring on the first serving cell according to the first monitoring information, and performing PDCCH monitoring on the second serving cell according to the second monitoring information.

Step 305: The UE receives or transmits data on PDSCH or PUSCH scheduled by the PDCCH according to the monitored PDCCH information.

That is, the UE may receive DCI on the PDCCH after monitoring the PDCCH, and the UE may receive/transmit data on the PDSCH or PUSCH scheduled by the DCI on the PDCCH, according to the monitored PDCCH information indicating information required by the UE to receive/transmit data on the PDSCH or PUSCH, such as time-frequency domain resource allocation information indicated by DCI contained in the PDCCH Information, etc.

Optionally, the determined/identified monitoring information of the PDCCH candidates for scheduling the first serving cell includes the number of PDCCH candidates and/or the number of non-overlapping CCEs to be monitored.

That is, the first monitoring information for performing PDCCH monitoring on the first serving cell includes the number of PDCCH candidates and/or the number of non-overlapping CCEs to be monitored on the first serving cell. The second monitoring information for performing PDCCH monitoring on the second serving cell includes the number of PDCCH candidates and/or the number of non-overlapping CCEs to be monitored on the second serving cell.

In an optional embodiment of the present disclosure, the PDCCH candidates are first PDCCH candidates used for scheduling the PDSCH of the first serving cell, or second PDCCH candidates used for scheduling the PUSCH of the first serving cell.

As an optional solution, the PDCCH candidates used for scheduling the first serving cell may be the first PDCCH candidates used for scheduling the PDSCH of the first serving cell.

As an optional solution, the PDCCH candidates used for scheduling the first serving cell may be the second PDCCH candidates used for scheduling the PUSCH of the first serving cell.

In an optional embodiment of the present disclosure, the PDCCH candidates include PDCCH candidates corresponding to CSS and/or PDCCH candidates corresponding to USS. The number of non-overlapping CCEs includes the number of non-overlapping CCEs corresponding to the CSS and/or the number of non-overlapping CCEs corresponding to the USS.

As an optional solution, the above-mentioned PDCCH candidates may include PDCCH candidates corresponding to the CSS.

As an optional solution, the above-mentioned PDCCH candidates may include PDCCH candidates corresponding to the CSS and PDCCH candidates corresponding to the USS.

As an optional solution, the above-mentioned PDCCH candidates may include PDCCH candidates corresponding to the USS.

Optionally, the first serving cell may be a primary cell, and the second serving cell may be a secondary cell. The above-mentioned PDCCH used for scheduling the first serving cell may include PDCCH candidates of the CSS used for scheduling the PDSCH and/or PUSCH and PDCCH candidates of the USS. Correspondingly, the PDCCH may be monitored on the determined PDCCH candidates of the CSS and PDCCH candidates of the USS.

Optionally, the first monitoring information includes monitoring information of PDCCH candidates corresponding to the CSS and/or monitoring information of PDCCH candidates corresponding to the USS; and/or, the second monitoring information corresponds to monitoring information of PDCCH candidates of the CSS and/or monitoring information of PDCCH candidates of the USS.

As an optional solution, the first monitoring information may include monitoring information of PDCCH candidates corresponding to the CSS and monitoring information of PDCCH candidates corresponding to the USS, and the second monitoring information may include monitoring information of PDCCH candidates corresponding to the USS.

That is, in practical disclosures, the first monitoring information may include the number of PDCCH candidates and/or the number of non-overlapping CCEs corresponding to the CSS to be monitored by the UE in the first serving cell, and/or the number of PDCCH candidates and/or the number of non-overlapping CCEs corresponding to the USS to be monitored by the UE in the first serving cell. The second monitoring information includes the number of PDCCH candidates and/or the number of non-overlapping CCEs corresponding to the CSS to be monitored by the UE in the second serving cell, and/or the number of PDCCH candidates and/or the number of non-overlapping CCEs corresponding to the USS to be monitored by the UE in the second serving cell.

As an optional solution, the first monitoring information may include the number of PDCCH candidates corresponding to the CSS and USS and the number of non-overlapping CCEs to be monitored by the UE in the first serving cell, and the second monitoring information includes the number of PDCCH candidates and/or the number of non-overlapping CCEs corresponding to the USS to be monitored by the UE in the second serving cell.

FIG. 4 is a schematic diagram illustrating that a plurality of serving cells schedule one serving cell according to an embodiment of the present disclosure. As shown in FIG. 4, the first serving cell may be the primary cell Pcell 401, and the second serving cell may be the secondary cell Scell 403. The UE may monitor PDCCH candidates used for scheduling PDSCH and/or PUSCH of the primary cell Pcell 401 on the primary cell, such as the PDCCH candidates corresponding to the CSS and a portion of the PDCCH candidates corresponding to the USS. The UE may also monitor PDCCH candidates used for scheduling PDSCH and/or PUSCH of the primary cell Pcell 401 on the secondary cell Scell 403, such as a portion of the PDCCH candidates corresponding to the USS.

Optionally, determining monitoring information for PDCCH candidates used for scheduling a first serving cell according to at least one of:

- a first total number which is a total number of PDCCH candidates used for scheduling the first serving cell and/or a total number of non-overlapping Control Channel Elements (CCEs);
- monitoring capability configuration information of the first serving cell;
- monitoring capability configuration information of the second serving cell;
- SubCarrier Spacing (SCS) configuration information of the first serving cell;
- SCS configuration information of the second serving cell.

In an optional embodiment of the present disclosure, the SCS configuration information of the first serving cell is SCS configuration information of active downlink BWP of the first service, and the SCS configuration information of the second serving cell is SCS configuration information of active downlink BWP of the second serving cell. In addition, the SCS configuration information of the active downlink BWP of the first serving cell and the SCS configuration information of the active BWP of the second serving cell scheduling the first serving cell may be the same or different.

For any serving cell, the monitoring capability configuration (monitoringCapabilityConfig) information of the serving cell may include related information of the monitoring capability configuration corresponding to the R16 protocol (monitoringCapabilityConfig-r16) of the 3rd generation partnership project (3GPP), and may also include other explicit or implicit information indicating the monitoring capability configuration of the serving cell, which is not limited in the present disclosure.

The related information of the monitoring capability configuration (monitoringCapabilityConfig-r16) specifically indicates that the monitoring capability provided by the serving cell to the UE may be monitoring capability corresponding to the R16 protocol (monitoringCapabilityConfig-r16=r16monitoringcapability) or may be monitoring capability corresponding to R15 protocol (monitoring CapabilityConfig-r16=r15monitoringcapability), and the two respectively indicate different monitoring capabilities.

It should be particularly noted that the monitoring capability configuration information of the first serving cell and the monitoring capability configuration information of the second serving cell may be the same or different.

It should be noted that the name of the monitoring capability configuration information involved in the embodiments of the present disclosure is not unique, and other names may also be used. The monitoring capability configuration information refers to information related to capability of the UE to perform PDCCH monitoring.

As an example, the first serving cell is the primary cell Pcell, and the second serving cell is the secondary cell Scell. When the monitoring capability configuration information of Pcell and Scell does not provide related information of the monitoringCapabilityConfig-r16, or provides the same related information of the monitoringCapabilityConfig-r16 (for example, when Pcell and Scell provide the same monitoringCapabilityConfig-r16=r16monitoringcapability, or provide the same monitoringCapabilityConfig-r16=r15 monitoringcapability), it indicates that the monitoring capability configuration information of the Pcell and the monitoring capability configuration information of the Scell are the same.

When the related information of monitoringCapabilityConfig-r16 provided by the monitoring capability configuration information of Pcell is monitoringCapabilityConfig-r16=r16monitoringcapability, and the related information of monitoringCapabilityConfig-r16 provided by the monitoring capability configuration information of Scell is monitoringCapabilityConfig-r16=r15monitoringcapability, or the related information of monitoringCapabilityConfig-r16 provided by the monitoring capability configuration information of Pcell is monitoringCapabilityConfig-r16=r15 monitoringcapability, and the related information of monitoringCapabilityConfig-r16 provided by the monitoring capability configuration information of Scell is monitoringCapabilityConfig-r16=r16monitoringcapability, it indicates that the monitoring capability configuration information of the Pcell and the monitoring capability configuration information of the Scell is different. Alternatively, the monitoring capability configuration information of any serving cell of Pcell and Scell provides the related information of monitoringCapabilityConfig-r16, and the monitoring capability configuration information of the other serving cell does not provide related information of monitoringCapabilityConfig-r16, it indicates that the monitoring capability configuration information of the Pcell and the monitoring capability configuration information of the Scell is different.

In an optional embodiment of the present disclosure, the first total number is the total number of PDCCH candidates used for scheduling the first serving cell and/or the total number of non-overlapping CCEs.

As an optional solution, the first serving cell is the primary cell Pcell, and the second serving cell is the secondary cell Scell, and the first total number may be the total number of PDCCH candidates in the Pcell and Scell scheduling the Pcell, and/or the total number of non-overlapping CCEs.

In an optional embodiment of the present disclosure, the monitoring information of the PDCCH candidates used for scheduling the first serving cell may be determined according to any one or combination of some of the first total number, the monitoring capability configuration information of the first serving cell and the second serving cell, and the SCS configuration information of the first serving cell and the second serving cell.

As an optional solution, the monitoring information of PDCCH candidates used for scheduling the first serving cell may be determined according to the first total number.

As an optional solution, the monitoring information of the PDCCH candidates used for scheduling the first serving cell may be determined according to the first total number, the monitoring capability configuration information of the first serving cell and the second serving cell, and the SCS configuration information of the first serving cell and the second serving cell.

Optionally, the determining monitoring information of the PDCCH candidates used for scheduling the first serving cell includes:

- determining maximum monitoring capability information;
- determining monitoring information of PDCCH candidates used for scheduling the first serving cell based on the first total number and the maximum monitoring capability information, wherein the first total number includes the total number of PDCCH candidates used for scheduling the first serving cell and/or the total number of non-overlapping CCEs.

In an optional embodiment of the present disclosure, the maximum monitoring capability information includes the maximum number of monitors that the UE may monitor PDCCH candidates used for scheduling the first serving cell, and/or the maximum number of monitors that the UE may monitor PDCCH non-overlapping CCEs used for scheduling the first serving cell in the first serving cell and the second serving cell.

That is, the maximum monitoring capability information may include, but is not limited to, one or more of the maximum number of monitors that the UE may monitor PDCCH candidates used for scheduling the first serving cell in the first serving cell and the second serving cell, and/or the maximum number of monitors that the UE may monitor PDCCH non-overlapping CCEs used for scheduling the first serving cell in the first serving cell and the second serving cell.

Optionally, the determining the maximum monitoring capability information includes:

determining the maximum monitoring capability information corresponding to the first serving cell and the second serving cell, in response to the monitoring capability configuration information of the first serving cell and the second serving cell being the same as the SCS configuration information.

In an optional embodiment of the present disclosure, for any serving cell, when the monitoring capability configuration information provided by the serving cell includes monitoringCapabilityConfig-r16=r16monitoringcapability, the maximum number of monitors that the UE monitors the PDCCH candidates used for scheduling the first serving cell in the serving cell is $$\min\left(\alpha 1 \cdot M_{PDCCH}^{max,(x,y),\mu},\ M_{PDCCH}^{total,(x,y),\mu}\right),$$

and/or the maximum number of monitors that the UE monitors the non-overlapping CCEs used for scheduling the first serving cell is $$\min\left(\alpha 1 \cdot C_{PDCCH}^{max,(x,y),\mu},\ C_{PDCCH}^{total,(x,y),\mu}\right).$$

Wherein, $$\alpha 1 \cdot M_{PDCCH}^{max,(x,y),\mu}$$

is the maximum number of PDCCH candidates that can be monitored by the UE in a time unit (x, y) in a serving cell of which the SCS is configured as μ, $$M_{PDCCH}^{total,(x,y)\mu}$$

is the total number of PDCCH candidates that can be monitored by the UE in a time unit (x, y) in all serving cells (i.e., serving cells of the UE) of which the SCS are configured as μ.

$$C_{PDCCH}^{max,(x,y),\mu}$$

is the maximum number of non-overlapping CCEs that can be monitored by the UE in a time unit (x, y) in a serving cell of which the SCS is configured as μ, $$C_{PDCCH}^{total,(x,y)\mu}$$

is the total number of non-overlapping CCEs that can be monitored by the UE in a time unit (x, y) in all serving cells (i.e., serving cells of the UE) of which the SCS are configured as μ. For the R16 protocol, the time unit (x, y) is a time granularity smaller than a slot, which may be referred to as a mini-slot.

Wherein, $$\min\left(\alpha 1 \cdot M_{PDCCH}^{max,(x,y),\mu},\ M_{PDCCH}^{total,(x,y),\mu}\right)$$

means the minimum value of $$\alpha 1 \cdot M_{PDCCH}^{max,(x,y),\mu} \text{ and } M_{PDCCH}^{total,(x,y),\mu},\ \min\left(\alpha 1 \cdot C_{PDCCH}^{max,(x,y),\mu},\ C_{PDCCH}^{total,(x,y),\mu}\right)$$

means the minimum value of $$\alpha 1 \cdot C_{PDCCH}^{max,(x,y),\mu} \text{ and } C_{PDCCH}^{total,(x,y),\mu}.$$

α1 is a related parameter used to determine the maximum number of monitors, which is configured by high-layer signaling or predetermined (through protocol), $0 \le \alpha 1 \le 1$.

In an optional embodiment of the present disclosure, for any serving cell, when the monitoring capability configuration information provided by the serving cell includes monitoringCapabilityConfig-r16=r15monitoringcapability, the maximum number of monitors that the UE monitors the PDCCH candidates used for scheduling the first serving cell in the serving cell is $$\min\left(\alpha 2 \cdot M_{PDCCH}^{max,slot,\mu},\ M_{PDCCH}^{total,slot,\mu}\right),$$

and/or the maximum number of monitors that the UE monitors the non-overlapping CCEs used for scheduling the first serving cell is $$\min\left(\alpha 2 \cdot C_{PDCCH}^{max,slot,\mu},\ C_{PDCCH}^{total,slot,\mu}\right).$$

Wherein, $$\alpha 2 \cdot M_{PDCCH}^{max,slot,\mu}$$

is the maximum number of PDCCH candidates that can be monitored by the UE in a slot in a serving cell of which the SCS is configured as μ, $$M_{PDCCH}^{total,slot,\mu}$$

is the total number of PDCCH candidates that can be monitored by the UE in a slot in all serving cells (i.e., serving cells of the UE) of which the SCS are configured as μ.

$$\alpha 2 \cdot C_{PDCCH}^{max,slot,\mu}$$

is the maximum number of non-overlapping CCEs that can be monitored by the UE in a slot in a serving cell of which the SCS is configured as μ, $$C_{PDCCH}^{total,slot,\mu}$$

is the total number of non-overlapping CCEs that can be monitored by the UE in a slot in all serving cells (i.e., serving cells of the UE) of which the SCS are configured as μ.

Wherein, $$\min\left(\alpha 2 \cdot M_{PDCCH}^{max,slot,\mu}, M_{PDCCH}^{total,slot,\mu}\right)$$

means the minimum value of $$\alpha 2 \cdot M_{PDCCH}^{max,slot,\mu}$$

and $$M_{PDCCH}^{total,slot,\mu}, \min\left(\alpha 2 \cdot C_{PDCCH}^{max,slot,\mu}, c_{PDCCH}^{total,slot,\mu}\right)$$

means the minimum value of $$\alpha 2 \cdot C_{PDCCH}^{max,slot,\mu} \text{ and } C_{PDCCH}^{total,slot,\mu}.$$

α2 is a related parameter used to determine the maximum number of monitors, which is configured by high-layer signaling or predetermined (through protocol), $0 \le \alpha 2 \le 1$.

It should be noted that the method for determining the maximum number of monitors that the serving cell monitors PDCCH candidates used for scheduling the first serving cell and the maximum number of monitors that the serving cell monitors non-overlapping CCEs used for scheduling the first serving cell may be based on actual monitoring capability configuration information of the serving cell. The above is only an example, which is not limited in the present disclosure.

In an optional embodiment of the present disclosure, the maximum monitoring capability information is the sum of the maximum number of monitors that the UE may monitor PDCCH candidates used for scheduling the first serving cell in the first serving cell and the second serving cell, and/or the maximum number of monitors that the UE may monitor PDCCH non-overlapping CCEs used for scheduling the first serving cell in the first serving cell and the second serving cell.

In an optional embodiment of the present disclosure, when the first total number is less than or equal to the maximum monitoring capability information,

- the first total number is determined as the monitoring information corresponding to the first serving cell and the second serving cell. That is, the first total number is determined as the number of PDCCH candidates and/or the number of non-overlapping CCEs to be monitored eventually by the UE in the first serving cell and the second serving cell.

Optionally, when the first total number is greater than the maximum monitoring capability information, the maximum monitoring capability information is determined as the monitoring information corresponding to the first serving cell and the second serving cell. That is, the maximum monitoring capability information is determined as the number of PDCCH candidates and/or the number of non-overlapping CCEs to be monitored eventually by the UE in the first serving cell and the second serving cell.

Optionally, the determining the monitoring information of the PDCCH candidates used for scheduling the first serving cell based on the first total number and maximum monitoring capability information includes:

- determining the monitoring information corresponding to the first serving cell and the second serving cell based on the first total number and the maximum monitoring capability information;
- determining the first monitoring information and the second monitoring information according to the monitoring information corresponding to the first serving cell and the second serving cell.

In an optional embodiment of the present disclosure, the first monitoring information and the second monitoring information are determined according to the monitoring information corresponding to the first serving cell and the second serving cell. Specifically, the monitoring information corresponding to the first serving cell and the second serving cell is allocated to determine the number of PDCCH candidates and/or the number of non-overlapping Control Channel Elements (CCEs) to be monitored when the UE performs PDCCH monitoring in the first serving cell, and the number of PDCCH candidates and/or the number of non-overlapping CCEs to be monitored when the UE performs PDCCH monitoring in the second serving cell.

Optionally, when the first total number is greater than the maximum monitoring capability information, the determining the first monitoring information and the second monitoring information according to the monitoring information corresponding to the first serving cell and the second serving cell includes:

- acquiring monitoring priorities corresponding to the first serving cell and the second serving cell;
- determining the first monitoring information and the second monitoring information according to the monitoring information corresponding to the first serving cell and the second serving cell and the monitoring priorities.

Wherein, levels of the monitoring priorities of the first serving cell and the second serving cell are priorities of allocating the number of PDCCH candidates and/or the number of non-overlapping CCEs to be monitored eventually by the UE in the first serving cell and the second serving cell to CSS set and USS set corresponding to the first serving cell and USS set corresponding to the second serving cell, and the specific priorities setting is not limited in the present disclosure.

In an optional embodiment of the present disclosure, the levels of the monitoring priorities corresponding to the first serving cell and the second serving cell are specifically appeared as that after allocating the number of PDCCH candidates and/or the number of non-overlapping CCEs to be monitored eventually by the UE in the first serving cell and the second serving cell to the SCC set corresponding to the first serving cell, whether to allocate the remaining number of PDCCH candidates and/or the remaining number of non-overlapping CCEs to the USS set corresponding to the first serving cell first or to the USS set corresponding to the second serving cell first.

In an optional embodiment of the present disclosure, the levels of the monitoring priorities corresponding to the first serving cell and the second serving cell may also be appeared as that whether to allocate the number of PDCCH candidates and/or the number of non-overlapping CCEs to be monitored eventually by the UE in the first serving cell and the second serving cell to the CSS set and the USS set corresponding to the first serving cell first or to the USS set corresponding to the second serving cell first.

As an optional solution, when the monitoring priority corresponding to the first serving cell is higher than the monitoring priority corresponding to the second serving cell, the number of PDCCH candidates and/or the number of non-overlapping CCEs to be monitored eventually by the UE in the first serving cell and the second serving cell is allocated firstly to the CSS set corresponding to the first serving cell, and then the remaining number of PDCCH candidates and/or the remaining number of non-overlapping CCEs is allocated to each USS corresponding to the first serving cell according to index of each USS in the USS set corresponding to the first serving cell. If there is still remaining, the remaining number of PDCCH candidates and/or the remaining number of non-overlapping CCEs is allocated according to index of each USS in the USS set corresponding to the second serving cell. At this time, the number of PDCCH candidates and/or the number of non-overlapping CCEs in the CSS set and USS set corresponding to the first serving cell is the first monitoring information for the UE to perform PDCCH monitoring in the first serving cell, and the number of PDCCH candidates and/or the number of non-overlapping CCEs in the USS set corresponding to the second serving cell is the second monitoring information for the UE to perform PDCCH monitoring in the second serving cell.

As an optional solution, when the monitoring priority of the second serving cell is higher than the monitoring priority of the first serving cell which is appeared specifically as that the monitoring priority of the USS set corresponding to the second serving cell is higher than the monitoring priority of the USS set corresponding to the first serving cell, the number of PDCCH candidates and/or the number of non-overlapping CCEs to be monitored eventually by the UE in the first serving cell and the second serving cell is allocated firstly to the CSS set corresponding to the first serving cell, and then the remaining number of PDCCH candidates and/or the remaining number of non-overlapping CCEs is allocated to each USS corresponding to the second serving cell according to index of each USS in the USS set corresponding to the second serving cell. If there is still remaining, the remaining number of PDCCH candidates and/or the remaining number of non-overlapping CCEs is allocated according to index of each USS in the USS set corresponding to the first serving cell. At this time, the number of PDCCH candidates and/or the number of non-overlapping CCEs in the CSS set and USS set corresponding to the first serving cell is the first monitoring information for the UE to perform PDCCH monitoring in the first serving cell, and the number of PDCCH candidates and/or the number of non-overlapping CCEs in the USS set corresponding to the second serving cell is the second monitoring information for the UE to perform PDCCH monitoring in the second serving cell.

Optionally, the first total number includes a second total number corresponding to the first serving cell and a third total number corresponding to the second serving cell;

the determining the maximum monitoring capability information includes:

determining first maximum monitoring capability information corresponding to the first serving cell and second maximum monitoring capability information corresponding to the second serving cell;

the determining monitoring information of PDCCH candidates used for scheduling the first serving cell based on the first total number and the maximum monitoring capability information includes:

determining the first monitoring information based on the second total number and the first maximum monitoring capability information;

determining the second monitoring information based on the third total number and the second maximum monitoring capability information.

In an optional embodiment of the present disclosure, the second total number corresponding to the first serving cell includes the total number of PDCCH candidates and/or the total number of non-overlapping CCEs used for scheduling the first serving cell and corresponding to the first serving cell. The third total number corresponding to the second serving cell includes the total number of PDCCH candidates and/or the total number of non-overlapping CCEs used for scheduling the first serving cell and corresponding to the second serving cell.

In an optional embodiment of the present disclosure, the first maximum monitoring capability information corresponding to the first serving cell includes the maximum number of monitors of monitoring the PDCCH candidates used for scheduling the first serving cell in the first serving cell, and/or the maximum number of monitors of monitoring the non-overlapping CCEs used for scheduling the first serving cell in the first serving cell. The second maximum monitoring capability information corresponding to the second serving cell includes the maximum number of monitors of monitoring the PDCCH candidates used for scheduling the first serving cell in the second serving cell, and/or the maximum number of monitors of monitoring the non-overlapping CCEs used for scheduling the first serving cell in the second serving cell.

Wherein, the first monitoring information for performing PDCCH monitoring in the first serving cell does not exceed the first maximum monitoring capability information corresponding to the first serving cell. That is, when the second total number is less than or equal to the first maximum monitoring capability information, the second total number is determined as the first monitoring information corresponding to the first serving cell. When the second total number is greater than the first maximum monitoring capability information, the first maximum monitoring capability information is determined as the first monitoring information corresponding to the first serving cell.

Wherein, the second monitoring information for performing PDCCH monitoring in the second serving cell does not exceed the second maximum monitoring capability information corresponding to the second serving cell. That is, when the third total number is less than or equal to the second maximum monitoring capability information, the third total number is determined as the second monitoring information corresponding to the second serving cell. When the third total number is greater than the second maximum monitoring capability information, the second maximum monitoring capability information is determined as the second monitoring information corresponding to the first serving cell.

Optionally, the number of DCI sizes monitored when the UE performs PDCCH monitoring on the first serving cell and the second serving cell is less than or equal to the first value.

Optionally, the number of DCI sizes monitored when PDCCH monitoring is performed on the first serving cell is less than or equal to the second value.

Optionally, the number of DCI sizes monitored when PDCCH monitoring is performed on the second serving cell is less than or equal to the third value.

Wherein, the above-mentioned first value, second value, and third value may be the same or different, which is not limited in the present disclosure.

As an optional solution, while limiting the number of first DCI monitored when the UE performs PDCCH monitoring on the first serving cell and the second serving cell, the number of the first DCI monitored when the UE performs the PDCCH monitoring on the first serving cell and/or the number of the first DCI monitored when the UE performs the PDCCH monitoring on the second serving cell are limited, respectively.

As an optional solution, the number of first DCI monitored when the UE performs PDCCH monitoring on the first serving cell and/or the number of first DCI monitored when the UE performs PDCCH monitoring on the second serving cell may be limited, while the number of first DCI monitored when the UE performs PDCCH monitoring on the first serving cell and the second serving cell is not limited.

For example, the number of DCI sizes monitored when PDCCH monitoring is performed on the first serving cell and the second serving cell is less than or equal to 4. In addition, the number of DCI sizes monitored when PDCCH monitoring is performed on the first serving cell is less than or equal to 2; and the number of DCI sizes monitored when PDCCH monitoring is performed on the second serving cell is less than or equal to 2.

Optionally, the number of the first DCI monitored when the UE performs PDCCH monitoring on the first serving cell and the second serving cell is less than or equal to the fourth value.

Optionally, the number of the first DCI monitored when PDCCH monitoring is performed on the first serving cell is less than or equal to the fifth value.

Optionally, the number of the first DCI monitored when PDCCH monitoring is performed on the second serving cell is less than or equal to the sixth value.

Wherein, the first DCI is DCI that uses Cell Radio Network Temporary Identity (C-RNTI) to scramble Cyclic Redundancy Check (CRC).

Wherein, the above-mentioned fourth value, fifth value and sixth value may be the same or different, which is not limited in the present disclosure.

As an optional solution, while limiting the number of DCI sizes monitored when the UE performs PDCCH monitoring on the first serving cell and the second serving cell, the number of the DCI sizes monitored when the UE performs PDCCH monitoring on the first serving cell and/or the number of DCI sizes monitored when the UE performs PDCCH monitoring on the second serving cell are limited, respectively.

As an optional solution, the number of DCI sizes monitored when the UE performs PDCCH monitoring on the first serving cell and/or the number of DCI sizes monitored when the UE performs PDCCH monitoring on the second serving cell may be limited, while the number of DCI sizes monitored when the UE performs PDCCH monitoring on the first serving cell and the second serving cell is not limited.

For example, the number of the first DCI monitored when PDCCH monitoring is performed on the first serving cell and the second serving cell is less than or equal to 3. In addition, the number of the first DCI monitored when PDCCH monitoring is performed on the first serving cell is less than or equal to 1; and the number of the first DCI monitored when PDCCH monitoring is performed on the second serving cell is less than or equal to 2.

Based on the above optional embodiments, a plurality of serving cells may be used to schedule one serving cell. That is, the PDCCH corresponding to the scheduled serving cell may be transmitted through resources of the scheduled serving cell, or through resources of scheduling serving cell.

Example 9

Taking that the first serving cell is the primary cell Pcell and the second serving cell is the secondary cell Scell as an example, several cases of determining monitoring information of PDCCH candidates used for scheduling the first serving cell are further described through several examples.

Example 9.1

The SCS configuration information of the active downlink BWP of the Pcell is the same as the SCS configuration information of the active downlink BWP of the Scell, and the monitoring capability configuration information of the Pcell is the same as the monitoring capability configuration information of the Scell.

If neither the monitoring capability configuration information of the Pcell nor the monitoring capability configuration information of the Scell provides the related information of monitoringCapabilityConfig-r16, or provides monitoringCapabilityConfig-r16=r15monitoringcapability, it means that the monitoring capability configuration information of the Pcell and the Scell are the same. There are the following two methods to determine the monitoring information of the PDCCH candidates used for scheduling the first serving cell.

Method 1:

For the monitoring information of the PDCCH candidates in the Pcell and Scell used for scheduling the Pcell, the UE is required to monitor PDCCH candidates that the number of which is not exceed $$\min\left(\gamma \cdot M_{PDCCH}^{max,slot,\mu},\ M_{PDCCH}^{total,slot,\mu}\right)$$

or non-overlapping CCEs that the number of which is not exceed $$\min\left(\gamma \cdot C_{PDCCH}^{max,slot,\mu},\ C_{PDCCH}^{total,slot,\mu}\right).$$

$\mu$ is the SCS configuration of the serving cell, and Y is a related parameter used to determine the maximum number of monitors, which is configured by high-layer signaling or predetermined (through protocol), $1 \le \gamma \le 2$.

Further, in a slot n, the Pcell corresponds to $I_{css}$ CSS sets, and the Pcell corresponds to $J_{uss\_1}$ USS sets, the Scell corresponds to $J_{uss\_2}$ USS sets.

$$M_{S_{css}(i)}^{(L)},$$

$0 \le i < I_{css}$ is marked as the number of PDCCH candidates in CSS set i, $$M_{S_{USS}(j\_1)}^{(L)},$$

$0 \le j\_1 < J_{uss\_1}$ is marked as the number of PDCCH candidates in USS set corresponding to the Pcell, and $$M_{S_{USS}(j\_2)}^{(L)},$$

$0 \le j\_2 < J_{uss\_2}$ is marked as the number of PDCCH candidates in USS set corresponding to the Scell.

When the first total number exceeds $$\min\left(\gamma \cdot M_{PDCCH}^{max,slot,\mu},\, M_{PDCCH}^{total,slot,\mu}\right)$$

or exceeds $$\min\left(\gamma \cdot C_{PDCCH}^{max,slot,\mu},\, C_{PDCCH}^{total,slot,\mu}\right),$$

when the monitoring priority of the Pcell is greater than the monitoring priority of the Scell, the number of PDCCH candidates and/or the number of non-overlapping CCEs corresponding to the maximum information monitoring capability is allocated firstly to the CSS set corresponding to the Pcell, and then the remaining number of PDCCH candidates and/or the remaining number of non-overlapping CCEs is allocated to the USS set corresponding to the Pcell and the USS set corresponding to the Scell. Since the USS corresponding to the Pcell and the USS corresponding to the Scell are indexed separately, the allocation method of the PDCCH candidates and the number of non-overlapping CCEs of the USS set corresponding to the Pcell and the USS set corresponding to the Scell may be determined by using the following two methods.

Method A: According to the index of each USS in the USS set corresponding to the Pcell, the remaining PDCCH candidates and the number of non-overlapping CCEs are allocated to each USS in the USS set corresponding to the Pcell. When there is still remaining after all PDCCH candidates and the number of non-overlapping CCEs in the USS set corresponding to the Pcell are allocated, the remaining PDCCH candidates and the number of non-overlapping CCEs are allocated to the USS set corresponding to the Scell. By using this method, the transmission of the PDCCH candidates corresponding to the Pcell can be guaranteed preferentially, and the reconfiguration of the UE can be guaranteed.

Method B: According to the index of each USS in the USS set corresponding to the Scell, the remaining PDCCH candidates and the number of non-overlapping CCEs are allocated to the USS set corresponding to the Scell. When there is still remaining after all PDCCH candidates and the number of non-overlapping CCEs in the USS set corresponding to the Scell are allocated, the remaining PDCCH candidates and the number of non-overlapping CCEs are allocated to the USS set corresponding to the Pcell. By using this method, the transmission of the PDCCH candidates corresponding to the Scell can be guaranteed preferentially, and the resources occupied by the PDCCH in the Pcell can be saved as much as possible.

In addition, for the monitoring of PDCCH candidates corresponding to the Pcell and Scell that schedule the Pcell, the UE monitors at most 4 DCI formats of different sizes, and the UE monitors at most 3 DCI formats of different sizes with C-RNTI scrambled CRC. Alternatively, for the monitoring of the PDCCH candidates corresponding to the Pcell that schedules the Pcell, the UE monitors at most 4 DCI formats of different sizes, and the UE monitors at most 3 DCI formats of different sizes with C-RNTI scrambled CRC. Alternatively, for the monitoring of PDCCH candidates corresponding to the Scell that schedules the Pcell, the UE monitors at most 4 DCI formats of different sizes, and the UE monitors at most 3 DCI formats of different sizes with C-RNTI scrambled CRC.

Method 2:

For the first monitoring information used for scheduling the Pcell and for performing PDCCH monitoring in the Pcell, the UE is required to monitor PDCCH candidates that the number of which is not exceed $$\min\left(\gamma 1 \cdot M_{PDCCH}^{max,slot,\mu},\, M_{PDCCH}^{total,slot,\mu}\right)$$

or non-overlapping CCEs that the number of which is not exceed $$\min\left(\gamma 1 \cdot C_{PDCCH}^{max,slot,\mu},\, C_{PDCCH}^{total,slot,\mu}\right).$$

$\gamma 1$ is a related parameter used to determine the maximum number of monitors, which is configured by high-layer signaling or predetermined, $0 \le \gamma 1 \le 1$.

For the second monitoring information used for scheduling the Pcell and for performing PDCCH monitoring in the Scell, the UE is required to monitor PDCCH candidates that the number of which is not exceed $$\min\left(\gamma 2 \cdot M_{PDCCH}^{max,slot,\mu},\, M_{PDCCH}^{total,slot,\mu}\right)$$

or non-overlapping CCEs that the number of which is not exceed $$\min\left(\gamma 2 \cdot C_{PDCCH}^{max,slot,\mu},\, C_{PDCCH}^{total,slot,\mu}\right).$$

μ is the SCS configuration of the serving cell, and γ2 is a related parameter used to determine the maximum number of monitors, which is configured by high-layer signaling or predetermined, 0≤γ2≤1.

In addition, for the monitoring of PDCCH candidates corresponding to the Pcell and Scell that schedule the Pcell, the UE monitors at most 4 DCI formats of different sizes, and the UE monitors at most 3 DCI formats of different sizes with C-RNTI scrambled CRC. Alternatively, for the monitoring of the PDCCH candidates corresponding to the Pcell that schedules the Pcell, the UE monitors at most 4 DCI formats of different sizes, and the UE monitors at most 3 DCI formats of different sizes with C-RNTI scrambled CRC. Alternatively, for the monitoring of PDCCH candidates corresponding to the Scell that schedules the Pcell, the UE monitors at most 4 DCI formats of different sizes, and the UE monitors at most 3 DCI formats of different sizes with C-RNTI scrambled CRC. By using this method, the alignment of DCI of different sizes can be reduced, and the DCI monitoring performance can be improved.

Example 9.2

The SCS configuration information (μ) of the active downlink BWP of the Pcell is different from the SCS configuration information of the active downlink BWP of the Scell, and the monitoring capability configuration information of the Pcell is the same as the monitoring capability configuration information of the Scell.

For the first monitoring information used for scheduling the Pcell and for performing PDCCH monitoring in the Pcell, the UE is required to monitor PDCCH candidates that the number of which is not exceed $$\min\left(\alpha 1 \cdot M_{PDCCH}^{max,slot,\mu 1},\ M_{PDCCH}^{total,slot,\mu 1}\right)$$

or non-overlapping CCEs that the number of which is not exceed $$\min\left(\alpha 1 \cdot C_{PDCCH}^{max,slot,\mu 1},\ C_{PDCCH}^{total,slot,\mu 1}\right).$$

μ1 is the SCS configuration of the serving cell, and α1 is configured by high-layer signaling or predetermined, 0≤α1≤1.

For the second monitoring information used for scheduling the Pcell and for performing PDCCH monitoring in the Scell, the UE is required to monitor PDCCH candidates that the number of which is not exceed $$\min\left(\alpha 2 \cdot M_{PDCCH}^{max,slot,\mu 2},\ M_{PDCCH}^{total,slot,\mu 2}\right)$$

or non-overlapping CCEs that the number of which is not exceed $$\min\left(\alpha 2 \cdot C_{PDCCH}^{max,slot,\mu 2},\ C_{PDCCH}^{total,slot,\mu 2}\right).$$

μ2 is the SCS configuration of the serving cell, and α2 is a related parameter used to determine the maximum number of monitors, which is configured by high-layer signaling or predetermined (through protocol), 0≤α2≤1.

In addition, for the monitoring of PDCCH candidates corresponding to the Pcell and Scell that schedule the Pcell, the UE monitors at most 4 DCI formats of different sizes, and the UE monitors at most 3 DCI formats of different sizes with C-RNTI scrambled CRC. Alternatively, for the monitoring of the PDCCH candidates corresponding to the Pcell that schedules the Pcell, the UE monitors at most 4 DCI formats of different sizes, and the UE monitors at most 3 DCI formats of different sizes with C-RNTI scrambled CRC. Alternatively, for the monitoring of PDCCH candidates corresponding to the Scell that schedules the Pcell, the UE monitors at most 4 DCI formats of different sizes, and the UE monitors at most 3 DCI formats of different sizes with C-RNTI scrambled CRC. By using this method, the alignment of DCI of different sizes can be reduced, and the DCI monitoring performance can be improved.

Example 9.3

The SCS configuration information (μ) of the active downlink BWP of the Pcell is the same as the SCS configuration information of the active downlink BWP of the Scell, and the monitoring capability configuration information of the Pcell is different from the monitoring capability configuration information of the Scell.

For example, the monitoring capability configuration information of the Pcell provides monitoringCapabilityConfig-r16=r16monitoringcapability, and the monitoring capability configuration information of the Scell provides monitoringCapabilityConfig-r16=r15monitoringcapability, and the monitoring capability configuration information of the Pcell and the monitoring capability configuration information of the Scell are different.

For the first monitoring information used for scheduling the Pcell and for performing PDCCH monitoring in the Pcell, the UE is required to monitor PDCCH candidates that the number of which is not exceed $$\min\left(\alpha 1 \cdot M_{PDCCH}^{max,(x,y),\mu},\ M_{PDCCH}^{total,(x,y),\mu}\right)$$

or non-overlapping CCEs that the number of which is not exceed $$\min\left(\alpha 1 \cdot C_{PDCCH}^{max,(x,y),\mu},\ C_{PDCCH}^{total,(x,y),\mu}\right).$$

μ is the SCS configuration of the serving cell, and α1 is a related parameter used to determine the maximum number of monitors, which is configured by high-layer signaling or predetermined (through protocol), 0≤α1≤1.

For the second monitoring information used for scheduling the Pcell and for performing PDCCH monitoring in the Scell, the UE is required to monitor PDCCH candidates that the number of which is not exceed $$\min\left(\alpha 2 \cdot M_{PDCCH}^{max,slot,\mu},\ M_{PDCCH}^{total,slot,\mu}\right)$$

or non-overlapping CCEs that the number of which is not exceed $$\min\left(\alpha 2 \cdot C_{PDCCH}^{max,slot,\mu},\ C_{PDCCH}^{total,slot,\mu}\right).$$

μ is the SCS configuration of the serving cell, and α2 is a related parameter used to determine the maximum number of monitors, which is configured by high-layer signaling or predetermined (through protocol), $0 \le \alpha 2 \le 1$.

Alternatively, the monitoring capability configuration information of the Pcell provides monitoringCapabilityConfig-r16=r15monitoringcapability, and the monitoring capability configuration information of the Scell provides monitoringCapabilityConfig-r16=r16monitoringcapability, and the monitoring capability configuration information of the Pcell and the monitoring capability configuration information of the Scell are different.

For the first monitoring information used for scheduling the Pcell and for performing PDCCH monitoring in the Pcell, the UE is required to monitor PDCCH candidates that the number of which is not exceed $$\min\left(\alpha 1 \cdot M_{PDCCH}^{max,slot,\mu},\ M_{PDCCH}^{total,slot,\mu}\right)$$

or non-overlapping CCEs that the number of which is not exceed $$\min\left(\alpha 1 \cdot C_{PDCCH}^{max,slot,\mu},\ C_{PDCCH}^{total,slot,\mu}\right).$$

$\mu$ is the SCS configuration of the serving cell, and $\alpha 1$ is a related parameter used to determine the maximum number of monitors, which is configured by high-layer signaling or predetermined (through protocol), $0 \le \alpha 1 \le 1$.

For the second monitoring information used for scheduling the Pcell and for performing PDCCH monitoring in the Scell, the UE is required to monitor PDCCH candidates that the number of which is not exceed $$\min\left(\alpha 2 \cdot M_{PDCCH}^{max,(x,y),\mu},\ M_{PDCCH}^{total,(x,y),\mu}\right)$$

or non-overlapping CCEs that the number of which is not exceed $$\min\left(\alpha 2 \cdot C_{PDCCH}^{max,(x,y),\mu},\ C_{PDCCH}^{total,(x,y),\mu}\right).$$

$\mu$ is the SCS configuration of the serving cell, and $\alpha 2$ is a related parameter used to determine the maximum number of monitors, which is configured by high-layer signaling or predetermined (through protocol), $0 \le \alpha 2 \le 1$.

In addition, for the monitoring of PDCCH candidates corresponding to the Pcell and Scell that schedule the Pcell, the UE monitors at most 4 DCI formats of different sizes, and the UE monitors at most 3 DCI formats of different sizes with C-RNTI scrambled CRC. Alternatively, for the monitoring of the PDCCH candidates corresponding to the Pcell that schedules the Pcell, the UE monitors at most 4 DCI formats of different sizes, and the UE monitors at most 3 DCI formats of different sizes with C-RNTI scrambled CRC. Alternatively, for the monitoring of PDCCH candidates corresponding to the Scell that schedules the Pcell, the UE monitors at most 4 DCI formats of different sizes, and the UE monitors at most 3 DCI formats of different sizes with C-RNTI scrambled CRC. By using this method, the alignment of DCI of different sizes can be reduced, and the DCI monitoring performance can be improved.

Example 9.4

The SCS configuration information (A) of the active downlink BWP of the Pcell is different from the SCS configuration information of the active downlink BWP of the Scell, and the monitoring capability configuration information of the Pcell is different from the monitoring capability configuration information of the Scell.

For example, the monitoring capability configuration information of the Pcell provides monitoringCapabilityConfig-r16=r16monitoringcapability, and the monitoring capability configuration information of the Scell provides monitoringCapabilityConfig-r16=r15monitoringcapability, and the monitoring capability configuration information of the Pcell and the monitoring capability configuration information of the Scell are different.

For the first monitoring information used for scheduling the Pcell and for performing PDCCH monitoring in the Pcell, the UE is required to monitor PDCCH candidates that the number of which is not exceed $$\min\left(\alpha 1 \cdot M_{PDCCH}^{max,(x,y),\mu 1},\ M_{PDCCH}^{total,(x,y),\mu 1}\right)$$

or non-overlapping CCEs that the number of which is not exceed $$\min\left(\alpha 1 \cdot C_{PDCCH}^{max,(x,y),\mu 1},\ C_{PDCCH}^{total,(x,y),\mu 1}\right).$$

$\mu 1$ is the SCS configuration of the serving cell, and $\alpha 1$ is a related parameter used to determine the maximum number of monitors, which is configured by high-layer signaling or predetermined (through protocol), $0 \le \alpha 1 \le 1$.

For the second monitoring information used for scheduling the Pcell and for performing PDCCH monitoring in the Scell, the UE is required to monitor PDCCH candidates that the number of which is not exceed $$\min\left(\alpha 2 \cdot M_{PDCCH}^{max,slot,\mu 2},\ M_{PDCCH}^{total,slot,\mu 2}\right)$$

or non-overlapping CCEs that the number of which is not exceed $$\min\left(\alpha 2 \cdot C_{PDCCH}^{max,slot,\mu 2},\ C_{PDCCH}^{total,slot,\mu 2}\right).$$

$\mu 2$ is the SCS configuration of the serving cell, and $\alpha 2$ is a related parameter used to determine the maximum number of monitors, which is configured by high-layer signaling or predetermined (through protocol), $0 \le \alpha 2 \le 1$.

Alternatively, the monitoring capability configuration information of the Pcell provides monitoringCapabilityConfig-r16=r15monitoringcapability, and the monitoring capability configuration information of the Scell provides monitoringCapabilityConfig-r16=r16monitoringcapability, and the monitoring capability configuration information of the Pcell and the monitoring capability configuration information of the Scell are different.

For the first monitoring information used for scheduling the Pcell and for performing PDCCH monitoring in the Pcell, the UE is required to monitor PDCCH candidates that the number of which is not exceed $$\min\left(\alpha 1 \cdot M_{PDCCH}^{max,slot,\mu 1}, M_{PDCCH}^{total,slot,\mu 1}\right)$$

or non-overlapping CCEs that the number of which is not exceed $$\min\left(\alpha 1 \cdot C_{PDCCH}^{max,slot,\mu 1}, C_{PDCCH}^{total,slot,\mu 1}\right).$$

μ1 is the SCS configuration of the serving cell, and α1 is a related parameter used to determine the maximum number of monitors, which is configured by high-layer signaling or predetermined (through protocol), 0≤α1≤1.

For the second monitoring information used for scheduling the Pcell and for performing PDCCH monitoring in the Scell, the UE is required to monitor PDCCH candidates that the number of which is not exceed $$\min\left(\alpha 2 \cdot M_{PDCCH}^{max,(x,y),\mu 2}, M_{PDCCH}^{total,(x,y),\mu 2}\right)$$

or non-overlapping CCEs that the number of which is not exceed $$\min\left(\alpha 2 \cdot C_{PDCCH}^{max,(x,y),\mu 2}, C_{PDCCH}^{total,(x,y),\mu 2}\right).$$

μ2 is the SCS configuration of the serving cell, and α2 is a related parameter used to determine the maximum number of monitors, which is configured by high-layer signaling or predetermined (through protocol), 0≤α2≤1.

In addition, for the monitoring of PDCCH candidates corresponding to the Pcell and Scell that schedule the Pcell, the UE monitors at most 4 DCI formats of different sizes, and the UE monitors at most 3 DCI formats of different sizes with C-RNTI scrambled CRC. Alternatively, for the monitoring of the PDCCH candidates corresponding to the Pcell that schedules the Pcell, the UE monitors at most 4 DCI formats of different sizes, and the UE monitors at most 3 DCI formats of different sizes with C-RNTI scrambled CRC. Alternatively, for the monitoring of PDCCH candidates corresponding to the Scell that schedules the Pcell, the UE monitors at most 4 DCI formats of different sizes, and the UE monitors at most 3 DCI formats of different sizes with C-RNTI scrambled CRC. By using this method, the alignment of DCI of different sizes can be reduced, and the DCI monitoring performance can be improved.

Based on the same principle as the method for configuring downlink control information provided in the embodiment of the present disclosure, an embodiment of the present disclosure also provides an apparatus for configuring downlink control information. The apparatus includes at least one processor, and the at least one processor is configured for:

configuring a specific DCI in a format, wherein the specific DCI is used to schedule PDSCH of at least one second serving cell on one first serving cell.

Optionally, the number of bits of the specific DCI satisfies at least one of the following:

the number of bits of the specific DCI is equal to a designated bit number;

the number of bits of the specific DCI is not equal to the number of bits of any existing DCI;

the number of bits of the specific DCI is equal to the number of bits of a first designated DCI that already exists in the first serving cell;

the number of bits of the specific DCI is equal to the number of bits of a second designated DCI that already exists in any serving cell in at least one second serving cell;

when the specific DCI is used to schedule the PDSCHs of at least two second serving cells, the number of bits of the specific DCI is equal to the number of bits of a third designated DCI that satisfies a first preset condition among third designated DCI that already exist in each of the at least two second serving cells;

when the specific DCI is used to schedule the PDSCHs of at least two second serving cells, the number of bits of the specific DCI is equal to the number of bits of a fourth designated DCI that already exists in a serving cell satisfying a second preset condition among the at least two second serving cells.

Optionally, the first preset condition includes at least one of the following:

the number of bits is the largest; the number of bits is the smallest.

Optionally, the second preset condition includes at least one of the following:

a serving cell index is the smallest; a serving cell index is the largest; a number pf TBs supported by the serving cell is the largest, the number pf TBs supported by the serving cell is the smallest.

Optionally, when the specific DCI is used to schedule PDSCHs of at least two second serving cells, and the number of bits of the specific DCI is equal to the number of bits of the second designated DCI that already exists in any one of the at least one second serving cell, the at least one processor described above is further configured to:

if the number of bits of the second designated DCI of each of the at least two second serving cells is not completely the same, the field contained in the specific DCI is configured based on the field contained in the second designated DCI whose bit number is equal to the number of bits of the specific DCI;

if the number of bits of the second designated DCI of each of the at least two second serving cells is the same, the fields contained in the specific DCI is configured based on fields contained in the second designated DCI of a serving cell satisfying a third preset condition among the at least two second serving cells.

Optionally, the specific DCI includes a predetermined field, and the predetermined field is used to indicate a second serving cell scheduled by the specific DCI;

wherein, the predetermined field is a newly defined field, or a newly defined field contained in an existing DCI.

The at least one processor is further configured to include at least one of the following fields in the specific DCI:

BWP indicator field; MASOI field; RMI field; ZCRT field; AP field; MCS field; NDI field; and RV field.

Optionally, for any type of the BWP indicator field, MASOI field, RMI field, ZCRT field, AP field, MCS field, NDI field, or RV field, the number of fields of this type is equal to the number of the second serving cells, that is, one field of this type corresponds to one of the second serving cells.

Optionally, for fields of a type among the BWP indicator field or the MASOI field, if the number of the fields of this type contained in the specific DCI is less than the number of the second serving cells, the fields of this type satisfy at least one of the following:

at least one field of this type is used for indicating indicator information corresponding to this field of at least two serving cells among the at least two second serving cells;

the field is not used for indicating indicator information corresponding to the field of any second serving cell;

this field is used for indicating the indicator information corresponding to the field of a specific serving cell among the at least two second serving cells; and this field is used for indicating specific message of at least one serving cell among the at least two second serving cells.

Optionally, the specific serving cell includes at least one of the following:

a first serving cell, wherein, the at least one second serving cells include the first serving cell;

a serving cell corresponding to the existing DCI used to determine the number of bits of the specific DCI;

a serving cell satisfying a fourth preset condition.

Optionally, for fields of any type of the RMI field, ZCRT field, AP field, MCS field, NDI field, or RV field, if a number of fields of this type contained in the specific DCI is less than the number of the second serving cells, the fields of this type are used for information indication for each of the second serving cells, and at least one field of this type is used to jointly indicate information corresponding to this field of at least two of the second serving cells.

An embodiment of the present disclosure also provides an apparatus for receiving downlink data. The apparatus includes at least one processor, and the at least one processor is configured to:

receive DCI on a serving cell;

receive data transmitted by a PDSCH of at least one serving cell scheduled by the DCI according to the specific DCI.

Optionally, the at least one processor described above may be configured to:

receive DCI in a predetermined format on the one serving cell, and the DCI in the predetermined format can be used to schedule PDSCHs of at least two serving cells.

Optionally, when the DCI in the predetermined format contains PDSCH information of at least two serving cells, when receiving data transmitted by the PDSCH of at least one serving cell scheduled by the DCI according to the DCI, the at least one processor may be configured to:

receive the data transmitted by the PDSCHs of the at least two serving cells scheduled by the DCI according to the DCI.

Optionally, the at least one processor described above is further configured to:

send HARQ-ACK information corresponding to the PDSCHs of the at least two serving cells.

Optionally, when receiving the data transmitted by the PDSCHs of the at least one serving cell scheduled by the DCI according to DCI, the at least one processor described above may be configured to:

determine that the DCI is used to schedule the PDSCHs of the at least two serving cells, according to indication of a predetermined field in the DCI;

receive the data transmitted by the PDSCHs of the at least two serving cells scheduled by the DCI.

Optionally, when receiving the data transmitted by the PDSCHs of the at least two serving cells scheduled by the DCI, the at least one processor described above may be configured to:

determine a serving cell indicated by each indicator field in the DCI;

determine the indication of the indicator field corresponding to each serving cell in the DCI; and receive the data transmitted by the PDSCH of each serving cell, according to the indication of the indicator field corresponding to each serving cell in the DCI.

Optionally, when determining the serving cell indicated by each indicator field in the DCI, the at least one processor described above may be configured to:

receive indicator information corresponding to each indicator field in the DCI;

determine a serving cell indicated by each indicator field in the DCI according to the indicator information.

Optionally, for any one of indicator fields in the DCI, when any one of the indicator field is used to indicate at least two serving cells, when determining the indication of the indicator field corresponding to each serving cell in the DCI, the at least one processor may be configured to:

receive a mapping relationship of any indicator field, where the mapping relationship is a corresponding relationship between a field indicator value and the indication of the at least two serving cells;

determine the indication that the indicator field corresponds to each of the at least two serving cells, according to the indicator value of the indicator field and the mapping relationship.

An embodiment of the present disclosure also provides an apparatus for monitoring Physical Downlink Control Channel (PDCCH), including at least one processor, and the at least one processor is configured to:

determine monitoring information of PDCCH candidates used for scheduling a first serving cell, where the monitoring information includes first monitoring information for PDCCH monitoring in the first serving cell and second monitoring information for PDCCH monitoring in a second serving cell;

perform PDCCH monitoring on the first serving cell according to the first monitoring information, and perform PDCCH monitoring on the second serving cell according to the second monitoring information.

Optionally, the monitoring information includes the number of PDCCH candidates and/or the number of non-overlapping Control Channel Elements (CCEs) to be monitored;

the PDCCH candidates are first PDCCH candidates used for scheduling the Physical Downlink Shared Channel (PDSCH) of the first serving cell, or second PDCCH candidates used for scheduling the Physical Uplink Shared Channel (PUSCH) of the first serving cell;

the PDCCH candidates include PDCCH candidates corresponding to Common Search Space (CSS) and/or PDCCH candidates corresponding to UE-specific Search Space (USS).

Optionally, the first monitoring information includes monitoring information of PDCCH candidates corresponding to the CSS and/or monitoring information of PDCCH candidates corresponding to the USS; and/or, the second monitoring information includes monitoring information of PDCCH candidates corresponding to the CSS and/or monitoring information of PDCCH candidates corresponding to the USS.

Optionally, the monitoring information of the PDCCH candidates for scheduling the first serving cell is determined according to at least one of:

a first total number which is a total number of PDCCH candidates used for scheduling the first serving cell and/or a total number of non-overlapping Control Channel Elements (CCEs);

monitoring capability configuration information of the first serving cell;

monitoring capability configuration information of the second serving cell;

SubCarrier Spacing (SCS) configuration information of the first serving cell;

SCS configuration information of the second serving cell.

Optionally, the at least one processor is configured to:

determine maximum monitoring capability information;

determine monitoring information of PDCCH candidates used for scheduling the first serving cell based on the first total number and the maximum monitoring capability information, wherein the first total number includes the total number of PDCCH candidates used for scheduling the first serving cell and/or the total number of non-overlapping CCEs.

Optionally, the at least one processor is configured to:

determine maximum monitoring capability information corresponding to the first serving cell and the second serving cell, in response to the monitoring capability configuration information of the first serving cell and the second serving cell being the same as the SCS configuration information.

The at least one processor is configured to:

determine the monitoring information corresponding to the first serving cell and the second serving cell based on the first total number and the maximum monitoring capability information;

determine the first monitoring information and the second monitoring information according to the monitoring information corresponding to the first serving cell and the second serving cell.

Optionally, the at least one processor is configured to:

acquire monitoring priorities corresponding to the first serving cell and the second serving cell;

determine the first monitoring information and the second monitoring information according to the monitoring information corresponding to the first serving cell and the second serving cell and the monitoring priorities.

Optionally, the first total number includes second total number corresponding to the first serving cell and third total number corresponding to the second serving cell;

The at least one processor is configured to:

determine first maximum monitoring capability information corresponding to the first serving cell and second maximum monitoring capability information corresponding to the second serving cell;

The at least one processor is configured to:

determine the first monitoring information based on the second total number and the first maximum monitoring capability information;

determine the second monitoring information based on the third total number and the second maximum monitoring capability information.

Optionally, the number of DCI sizes monitored when the PDCCH monitoring is performed on the first serving cell and the second serving cell is less than or equal to a first value; and/or, the number of DCI sizes monitored when the PDCCH monitoring is performed on the first serving cell is less than or equal to a second value; and/or, the number of DCI sizes monitored when the PDCCH monitoring is performed on the second serving cell is less than or equal to a third value; and/or, the number of DCI monitored when the PDCCH monitoring is performed on the first serving cell and the second serving cell is less than or equal to a fourth value; and/or, the number of DCI monitored when the PDCCH monitoring is performed on the first serving cell is less than or equal to a fifth value; and/or, the number of DCI monitored when the PDCCH monitoring is performed on the second serving cell is less than or equal to a sixth value.

It should be noted that, because the apparatus provided in the embodiment of the present disclosure is an apparatus that can perform the method in the embodiments of the present disclosure, those skilled in the art can understand the specific implementations of the apparatus and various variations in the embodiments of the present disclosure based on the methods provided therein. Thus, how the apparatus implements the method in the embodiments of the present disclosure will not be described in detail here. As long as those skilled in the art implement the methods in the embodiments of the present disclosure, the apparatus used are all within the scope of protection intended by this disclosure.

Based on the same principle as the method provided in the embodiments of the present disclosure, the embodiments of the present disclosure further provides an electronic device, the electronic device includes a memory, configured to store computer program; and a processor, configured to perform the methods provided in any optional embodiment of the present disclosure when the above computer program is executed.

An embodiment of the present disclosure further provides a computer-readable storage medium, used to store a computer program that, when executed by a processor, is caused to execute a method provided in any optional embodiment of the present disclosure.

FIG. 5 is a schematic structural diagram illustrating an electronic device to which an embodiment of the present disclosure is applicable. As an alternative, FIG. 5 shows a schematic structural diagram of an electronic device (which may be the UE or the base station described above or other devices applicable to the method provided in the embodiment of the present disclosure) provided in the embodiment of the present disclosure. As shown in FIG. 5, the electronic device 500 includes a processor 501 and a memory 503. The processor 501 and the memory 505 are connected, for example, through a bus 503. Optionally, the electronic device 500 may further include a transceiver 507. It should be noted that, in practical disclosures, the transceiver 4004 is not limited to one, and the structure of the electronic device 500 does not limit the embodiments of the present disclosure.

The processor 501 may be a CPU (Central Processing Unit), a general-purpose processor, a DSP (Digital Signal Processor), an ASIC (Disclosure Specific Integrated Circuit), or an FPGA (Field Programmable Gate Array), or other programmable logic devices, transistor logic devices, hardware components or any combination thereof. It may implement or execute various exemplary logical blocks, modules, and circuits described in connection with the disclosure of this disclosure. The processor 501 may also be a combination that realizes a computing function, for example, a combination including one or more microprocessors, a combination of a DSP and a microprocessor, and the like.

The bus 503 may include a path for transmitting information between the aforementioned components. The bus 503 may be a PCI (Peripheral Component Interconnect) bus or an EISA (Extended Industry Standard Architecture) bus, or the like. The bus 503 may be divided into an address bus, a data bus, a control bus, and the like. For ease of representation, only a thick line is used in FIG. 5, but it does not mean that there is only one bus or one type of bus.

The memory 505 may be a ROM (Read Only Memory) or other type of static storage device that may store static information and instructions, a RAM (Random Access Memory), or other type of dynamic storage device that may store information and instructions, also may be EEPROM (Electrically Erasable Programmable Read Only Memory), CD-ROM (Compact Disc Read Only Memory) or other optical disk storage, optical disk storage (including compact discs, laser discs, optical discs, digital versatile discs, and Blu-ray discs, etc.), a disk storage media or other magnetic storage device, or any other media that may carry or store desired program code in form of instructions or data structures and may be accessed by the computer, but this embodiment is not limited to this.

The memory 505 is configured to store disclosure program code for executing the method of the present disclosure, and execution of the disclosure program code is controlled by the processor 4001. The processor 501 is configured to execute disclosure program code stored in the memory 505 to implement the content shown in any one of the foregoing method embodiments.

In addition, the UE or the base station of FIG. 5 may be implemented by including the processor 501 for controlling operations of the electronic device according to each of the embodiments of FIG. 1 to FIG. 4 or a combination thereof and the transceiver 507.

It should be understood that although steps in the flowchart of the drawings are sequentially showed in accordance with the directions of the arrows, these steps are not necessarily executed in the order indicated by the arrows. Unless explicitly stated herein, the execution order of these steps is not strictly limited, and they may be executed in other orders. Moreover, at least part of the steps in the flowchart of the drawing may include a plurality of sub-steps or a plurality of stages. These sub-steps or stages are not necessarily executed at the same time, and may be executed at different times. The execution order is not necessarily executed sequentially, and may be executed in turn or alternately with other steps or at least part of the sub-steps or stages of other steps.

The above description is only part of the implementations of the present disclosure. It should be noted that for those ordinary skilled in the art, several improvements and retouching may be made without departing from the principles of the present disclosure, and these improvements and retouching should be regarded within the scope of protection of this disclosure.

The invention claimed is:

1. A method performed by a user equipment (UE) in a wireless communication system, the method comprising:

receiving, from a base station, information on a downlink control information (DCI) format for scheduling one physical downlink shared channel (PDSCH) in one cell or multiple PDSCHs in multiple cells;

receiving data on the one PDSCH of the one cell in case that the DCI format schedules the one PDSCH of the one cell; and receiving data on the multiple PDSCHs of the multiple cells in case that the DCI format schedules the multiple PDSCHs of the multiple cells, wherein an indicator included in the DCI format indicates scheduled cells corresponding to the multiple cells in case that the DCI format schedules the multiple PDSCHs of the multiple cells, wherein a bandwidth part (BWP) indicator included in the DCI format is applicable to the scheduled cells in case that the DCI format schedules the multiple PDSCHs of the multiple cells, the BWP indicator corresponding to an ascending order of a BWP identifier, wherein a rate matching indicator (RMI) included in the DCI format indicates a rate matching value to be used on active BWPs of the scheduled cells in case that the DCI format schedules the multiple PDSCHs of the multiple cells, and wherein a zero power channel state information-reference signal (ZP CSI-RS) trigger indicator included in the DCI format indicates a CSI-RS value to be used on the active BWPs of the scheduled cells in case that the DCI format schedules the multiple PDSCHs of the multiple cells.

2. The method of claim 1, further comprising receiving, from the base station, higher layer signaling information for scheduling in the multiple cells.

3. A user equipment (UE) in a wireless communication system, the UE comprising:

a transceiver; and a processor configured to:

receive, through the transceiver from a base station, information on a downlink control information (DCI) format for scheduling one physical downlink shared channel (PDSCH) in one cell or multiple PDSCHs in multiple cells;

receive, through the transceiver, data on the one PDSCH of the one cell in case that the DCI format schedules the one PDSCH of the one cell; and receive, through the transceiver, data on the multiple PDSCHs of the multiple cells in case that the DCI format schedules the multiple PDSCHs of the multiple cells, wherein an indicator included in the DCI format indicates scheduled cells corresponding to the multiple cells in case that the DCI format schedules the multiple PDSCHs of the multiple cells, wherein a bandwidth part (BWP) indicator included in the DCI format is applicable to the scheduled cells in case that the DCI format schedules the multiple PDSCHs of the multiple cells, the BWP indicator corresponding to an ascending order of a BWP identifier, wherein a rate matching indicator (RMI) included in the DCI format indicates a rate matching value to be used on active BWPs of the scheduled cells in case that the DCI format schedules the multiple PDSCHs of the multiple cells, and wherein a zero power channel state information-reference signal (ZP CSI-RS) trigger indicator included in the DCI format indicates a CSI-RS value to be used on the active BWPs of the scheduled cells in case that the DCI format schedules the multiple PDSCHs of the multiple cells.

4. The UE of claim 3, wherein the processor is further configured to receive, through the transceiver from the base station, higher layer signaling information for scheduling in the multiple cells.

5. A method performed by a base station in a wireless communication system, the method comprising:

transmitting, to a user equipment (UE), information on a downlink control information (DCI) format for scheduling one physical downlink shared channel (PDSCH) in one cell or multiple PDSCHs in multiple cells;

transmitting data on the one PDSCH of the one cell in case that the DCI format schedules the one PDSCH of the one cell; and transmitting data on the multiple PDSCHs of the multiple cells in case that the DCI format schedules the multiple PDSCHs of the multiple cells, wherein an indicator included in the DCI format indicates scheduled cells corresponding to the multiple cells in case that the DCI format schedules the multiple PDSCHs of the multiple cells, wherein a bandwidth part (BWP) indicator included in the DCI format is applicable to the scheduled cells in case that the DCI format schedules the multiple PDSCHs of the multiple cells, the BWP indicator corresponding to an ascending order of a BWP identifier, wherein a rate matching indicator (RMI) included in the DCI format indicates a rate matching value to be used on active BWPs of the scheduled cells in case that the DCI format schedules the multiple PDSCHs of the multiple cells, and wherein a zero power channel state information-reference signal (ZP CSI-RS) trigger indicator included in the DCI format indicates a CSI-RS value to be used on the active BWPs of the scheduled cells in case that the DCI format schedules the multiple PDSCHs of the multiple cells.

6. The method of claim 5, further comprising transmitting, to the UE, higher layer signaling information for scheduling in the multiple cells.

7. A base station in a wireless communication system, the base station comprising:

a transceiver; and a processor configured to:

transmit, to a user equipment (UE) through the transceiver, information on a downlink control information (DCI) format for scheduling one physical downlink shared channel (PDSCH) in one cell or multiple PDSCHs in multiple cells;

transmit, through the transceiver, data on the one PDSCH of the one cell in case that the DCI format schedules the one PDSCH of the one cell; and transmit, through the transceiver, data on the multiple PDSCHs of the multiple cells in case that the DCI format schedules the multiple PDSCHs of the multiple cells, wherein an indicator included in the DCI format indicates scheduled cells corresponding to the multiple cells in case that the DCI format schedules the multiple PDSCHs of the multiple cells, wherein a bandwidth part (BWP) indicator included in the DCI format is applicable to the scheduled cells in case that the DCI format schedules the multiple PDSCHs of the multiple cells, the BWP indicator corresponding to an ascending order of a BWP identifier, wherein a rate matching indicator (RMI) included in the DCI format indicates a rate matching value to be used on active BWPs of the scheduled cells in case that the DCI format schedules the multiple PDSCHs of the multiple cells, and wherein a zero power channel state information-reference signal (ZP CSI-RS) trigger indicator included in the DCI format indicates a CSI-RS value to be used on the active BWPs of the scheduled cells in case that the DCI format schedules the multiple PDSCHs of the multiple cells.

8. The base station of claim 7, wherein the processor is further configured to transmit, to the UE through the transceiver, higher layer signaling information for scheduling in the multiple cells.

* * * * *